US011946360B2

(12) United States Patent
Maus et al.

(10) Patent No.: US 11,946,360 B2
(45) Date of Patent: Apr. 2, 2024

(54) DETERMINING THE LIKELIHOOD AND UNCERTAINTY OF THE WELLBORE BEING AT A PARTICULAR STRATIGRAPHIC VERTICAL DEPTH

(71) Applicant: Magnetic Variation Services, LLC, Denver, CO (US)

(72) Inventors: Stefan Maus, Boulder, CO (US); Alexander Michael Mitkus, Denver, CO (US); Timothy William Gee, Englewood, CO (US)

(73) Assignee: Magnetic Variation Services, LLC, Denver, CO (US)

( * ) Notice: Subject to any disclaimer, the term of this patent is extended or adjusted under 35 U.S.C. 154(b) by 944 days.

(21) Appl. No.: 16/869,385

(22) Filed: May 7, 2020

(65) Prior Publication Data

US 2020/0355066 A1 Nov. 12, 2020

Related U.S. Application Data

(63) Continuation-in-part of application No. 16/821,397, filed on Mar. 17, 2020.
(Continued)

(51) Int. Cl.
*E21B 44/00* (2006.01)
*E21B 7/04* (2006.01)
(Continued)

(52) U.S. Cl.
CPC .............. *E21B 47/04* (2013.01); *E21B 7/04* (2013.01); *E21B 44/00* (2013.01); *G01B 21/18* (2013.01);
(Continued)

(58) Field of Classification Search
CPC . E21B 47/04; E21B 7/04; E21B 44/00; E21B 2200/20; E21B 47/02; G01B 21/18; G01B 21/045; G05B 13/04; G05B 13/041
See application file for complete search history.

(56) References Cited

U.S. PATENT DOCUMENTS 5,311,951 A 5/1994 Kyte et al.
6,237,404 B1 5/2001 Crary et al.
(Continued)

FOREIGN PATENT DOCUMENTS

CN 102031964 A * 4/2011 ............... G01V 3/28
WO WO 2016032640 A1 * 3/2016 ............. E21B 7/068
(Continued)

OTHER PUBLICATIONS

Maus, et al., "Automated Geosteering with Fault Detection and Multi-Solution Tracking", IADC/SPE International Drilling Conference and Exhibition, Feb. 25, 2020, pp. 1-12.
(Continued)

*Primary Examiner* — Kandasamy Thangavelu
(74) *Attorney, Agent, or Firm* — Kilpatrick Townsend & Stockton LLP

(57) ABSTRACT

Stratigraphic analysis includes determining misfit values between stratigraphic vertical depth of an offset wellbore, $SVD_{ow}$ and measured depth of a subject wellbore. A likelihood that the target measured depth is equal to or within a tolerance of stratigraphic vertical depth of the subject wellbore, $SVD_{sw}$, for sequences of stratigraphic vertical depth is calculated. A probability weighted average and an uncertainty that the target measured depth for the subject wellbore, $TMD_{sw}$, is equal to or within a tolerance of stratigraphic vertical depth of the subject wellbore, is calculated. A continuous probability function over a range of measured depth that the target measured depth for the subject wellbore, $TMD_{sw}$, is equal to or within a tolerance of strati-
(Continued)

Vertical wellbore stratigraphic interpretation example.

graphic vertical depth of the subject wellbore, $SVD_{sw}$, is calculated. The likelihood, the probability weighted average, the uncertainty, and the continuous probability function are used to make drilling decisions

31 Claims, 17 Drawing Sheets

Related U.S. Application Data

(60) Provisional application No. 62/985,224, filed on Mar. 4, 2020, provisional application No. 62/932,134, filed on Nov. 7, 2019, provisional application No. 62/844,488, filed on May 7, 2019.

(51) Int. Cl.
*E21B 47/04* (2012.01)
*G01B 21/18* (2006.01)
*G05B 13/04* (2006.01)

(52) U.S. Cl.
CPC ........... *G05B 13/04* (2013.01); *G05B 13/041* (2013.01); *E21B 2200/20* (2020.05)

(56) References Cited

U.S. PATENT DOCUMENTS

| | | | |
|---|---|---|---|
| 6,408,953 B1 | 6/2002 | Goldman et al. |
| 6,424,919 B1 | 7/2002 | Moran et al. |
| 6,438,495 B1 | 8/2002 | Chau et al. |
| 6,817,425 B2 | 11/2004 | Schultz et al. |
| 6,868,921 B2 | 3/2005 | Burrows et al. |
| 6,968,909 B2 | 11/2005 | Aldred et al. |
| 7,003,439 B2 | 2/2006 | Aldred et al. |
| 7,032,689 B2 | 4/2006 | Goldman et al. |
| 7,073,582 B2 | 7/2006 | Connell et al. |
| 7,128,167 B2 | 10/2006 | Dunlop et al. |
| 7,142,986 B2 | 11/2006 | Moran |
| 7,165,632 B2 | 1/2007 | Burrows et al. |
| 7,191,850 B2 | 3/2007 | Williams |
| 7,302,346 B2 | 11/2007 | Chang et al. |
| 7,357,196 B2 | 4/2008 | Goldman et al. |
| 7,359,844 B2 | 4/2008 | Sung et al. |
| 7,460,957 B2 | 12/2008 | Prange et al. |
| 7,546,209 B2 | 6/2009 | Williams |
| 7,555,391 B2 | 6/2009 | Gleitman et al. |
| 7,606,666 B2 | 10/2009 | Repin et al. |
| 7,650,241 B2 | 1/2010 | Jogi et al. |
| 7,684,929 B2 | 3/2010 | Prange et al. |
| 7,814,989 B2 | 10/2010 | Nikolakis-Mouchas et al. |
| 7,861,800 B2 | 1/2011 | Chapman et al. |
| 7,873,476 B2 | 1/2011 | Thorne |
| 7,921,937 B2 | 4/2011 | Brackin et al. |
| 7,946,361 B2 | 5/2011 | Gurjar et al. |
| 7,953,586 B2 | 5/2011 | Chen et al. |
| 7,957,946 B2 | 6/2011 | Pirovolou |
| 7,962,288 B2 | 6/2011 | Gleitman |
| 7,999,695 B2 | 8/2011 | Rodney et al. |
| 8,061,440 B2 | 11/2011 | Chapman et al. |
| 8,061,444 B2 | 11/2011 | Mullins et al. |
| 8,210,257 B2 | 7/2012 | Dusterhoft et al. |
| 8,274,399 B2 | 9/2012 | Strachan et al. |
| 8,278,931 B2 | 10/2012 | Fang et al. |
| 8,376,065 B2 | 2/2013 | Teodorescu et al. |
| 8,407,006 B2 | 3/2013 | Gleitman |
| 8,442,769 B2 | 5/2013 | Phillips et al. |
| 8,463,549 B1 | 6/2013 | Selman et al. |
| 8,463,550 B1 | 6/2013 | Selman et al. |
| 8,489,375 B2 | 7/2013 | Omeragic et al. |
| 8,577,660 B2 | 11/2013 | Wendt et al. |
| 8,612,194 B2 | 12/2013 | Horne et al. |
| 8,614,713 B1 | 12/2013 | Selman et al. |
| 8,615,363 B2 | 12/2013 | Aamodt et al. |
| 8,676,558 B2 | 3/2014 | Pirovolou |
| 8,752,648 B2 | 6/2014 | Goebel et al. |
| 8,768,627 B2 | 7/2014 | Paulk |
| 8,775,145 B2 | 7/2014 | Downton |
| 8,818,779 B2 | 8/2014 | Sadlier et al. |
| 8,875,806 B2 | 11/2014 | Williams |
| 8,939,233 B2 | 1/2015 | Edbury et al. |
| 8,960,326 B2 | 2/2015 | Williams |
| 8,965,703 B2 | 2/2015 | Prakash et al. |
| 8,990,021 B2 | 3/2015 | Jeffryes |
| 9,022,140 B2 | 5/2015 | Marx et al. |
| 9,041,547 B2 | 5/2015 | Hartmann |
| 9,085,958 B2 | 7/2015 | Laing et al. |
| 9,091,139 B2 | 7/2015 | Weng et al. |
| 9,091,140 B1 | 7/2015 | Selman et al. |
| 9,103,192 B2 | 8/2015 | Yang |
| 9,103,936 B2 | 8/2015 | Calleja et al. |
| 9,129,236 B2 | 9/2015 | Elinas et al. |
| 9,181,791 B2 | 11/2015 | Dolgin et al. |
| 9,181,792 B2 | 11/2015 | Pena |
| 9,182,517 B1* | 11/2015 | Selman ................ E21B 47/022 |
| 9,223,041 B2 | 12/2015 | Wendt et al. |
| 9,238,960 B2 | 1/2016 | Benson et al. |
| 9,322,261 B2 | 4/2016 | Selman et al. |
| 9,388,680 B2 | 7/2016 | Moran |
| 9,424,667 B2 | 8/2016 | Pena et al. |
| 9,441,430 B2 | 9/2016 | Selman et al. |
| 9,534,446 B2 | 1/2017 | Williams |
| 9,556,728 B2 | 1/2017 | De Reynal, Jr. |
| 9,581,018 B2 | 2/2017 | Dolgin et al. |
| 9,702,240 B2 | 7/2017 | Bittar et al. |
| 2007/0061081 A1 | 3/2007 | Moran |
| 2008/0314641 A1 | 12/2008 | McClard |
| 2009/0157367 A1 | 6/2009 | Meyer et al. |
| 2009/0260881 A1 | 10/2009 | Williams |
| 2010/0076740 A1 | 3/2010 | Kuchuk et al. |
| 2010/0185395 A1 | 7/2010 | Pirovolou et al. |
| 2010/0282508 A1 | 11/2010 | Johnston et al. |
| 2011/0031019 A1 | 2/2011 | Williams |
| 2011/0161133 A1 | 6/2011 | Staveley et al. |
| 2011/0191029 A1 | 8/2011 | Jalali et al. |
| 2011/0232967 A1 | 9/2011 | Williams |
| 2012/0111631 A1 | 5/2012 | Williams |
| 2012/0191354 A1 | 7/2012 | Caycedo |
| 2012/0292111 A1 | 11/2012 | Williams |
| 2013/0166263 A1 | 6/2013 | Shen et al. |
| 2013/0238306 A1 | 9/2013 | Lagenwalter et al. |
| 2014/0000964 A1 | 1/2014 | Selman et al. |
| 2014/0379265 A1 | 12/2014 | Beda et al. |
| 2015/0120196 A1 | 4/2015 | Li et al. |
| 2015/0134255 A1 | 5/2015 | Zhang et al. |
| 2015/0134257 A1* | 5/2015 | Erge ................ E21B 49/003 702/9 |
| 2015/0193705 A1 | 7/2015 | Benson et al. |
| 2015/0211352 A1 | 7/2015 | Sugiura |
| 2015/0218914 A1 | 8/2015 | Marx et al. |
| 2015/0227841 A1 | 8/2015 | Laing et al. |
| 2015/0330209 A1 | 11/2015 | Panchal et al. |
| 2015/0369031 A1 | 12/2015 | Yang et al. |
| 2016/0003008 A1 | 1/2016 | Uribe et al. |
| 2016/0047220 A1 | 2/2016 | Sharp et al. |
| 2016/0076357 A1 | 3/2016 | Hbaieb |
| 2016/0117424 A1 | 4/2016 | Hohl et al. |
| 2016/0186496 A1 | 6/2016 | De Bakker et al. |
| 2016/0265334 A1 | 9/2016 | Dykstra et al. |
| 2016/0281489 A1 | 9/2016 | Dykstra et al. |
| 2016/0290117 A1 | 10/2016 | Dykstra et al. |
| 2016/0327678 A1 | 11/2016 | Benson et al. |
| 2016/0333673 A1 | 11/2016 | Anno et al. |
| 2016/0370480 A1 | 12/2016 | Shetty et al. |
| 2017/0058658 A1 | 3/2017 | Spencer et al. |
| 2017/0145804 A1 | 5/2017 | Wessling et al. |
| 2017/0152739 A1 | 6/2017 | Benson et al. |
| 2017/0183952 A1 | 6/2017 | Williams |
| 2017/0314385 A1 | 11/2017 | Hori et al. |
| 2017/0322332 A1 | 11/2017 | Cooper et al. |
| 2018/0068037 A1 | 3/2018 | Williams |
| 2018/0073351 A9 | 3/2018 | Benson et al. |
| 2018/0225778 A1 | 8/2018 | Grant et al. |

(56) References Cited

U.S. PATENT DOCUMENTS

FOREIGN PATENT DOCUMENTS

| WO | WO 2016044464 A1 * | 3/2016 | ............. E21B 47/02 |
| WO | 2017116417 A1 | 7/2017 | |
| WO | 2017142508 A1 | 8/2017 | |
| WO | WO 2018118020 A1 * | 6/2018 | ............... E21B 7/06 |
| WO | 2019051435 A1 | 3/2019 | |

OTHER PUBLICATIONS

PCT/US2020/016434, "International Search Report and Written Opinion", dated Apr. 29, 2020, 9 pages.
PCT/US2020/023150, "International Search Report and Written Opinion", dated Jun. 17, 2020, 12 pages.
Tristan, et al., "Cybersteering: Automated Geosteering by Way of Distributed Computing and Graph Databases in the Cloud", Proceedings of the 7th Unconventional Resources Technology Conference, Devon Energy Corporation, Jul. 2019, 8 pages.
Winkler, "Geosteering by Exact Inference on a Bayesian Network", Geophysics, vol. 82, No. 5, May 2017, 27 pages.
"Case 00-1053, 1059", *Union Pacific Resources Company*, Plaintiff-appellant, V. *Chesapeake Energy Corporation And Chesapeake Operating, Inc.*, Defendants-cross Appellants, *and Chesapeake Exploration Limited Partnership*, Defendant., Jan. 5, 2001, 11 pages.
U.S. Appl. No. 16/821,397, "Non-Final Office Action", dated Jan. 13, 2023, 43 pages.
U.S. Appl. No. 16/821,397, "Non-Final Office Action", dated Sep. 26, 2022, 34 pages.
U.S. Appl. No. 16/821,397, "Notice of Allowance", dated Jun. 13, 2023, 21 pages.

* cited by examiner

Vertical wellbore stratigraphic interpretation example.

Heat map curve interpretation for a horizontal wellbore with a flat reference geomodel.

*Heat map curve interpretation for a horizontal wellbore with a 3D reference geomodel*

Indexing of interpretations *i* versus subsets of interpretations with corresponding depth *j*, showing a large number of possible paths (interpretations) with a smaller number of outcomes *j* at the target depth (right side in figure), as may be commonly observed.

*Modification of interpretations from the last inflection point, being used to derive a continuous probability distribution $p(SVD_{SW})$ for the stratigraphic vertical depth of the subject well, $SVD_{SW}$*

DETERMINING THE LIKELIHOOD AND UNCERTAINTY OF THE WELLBORE BEING AT A PARTICULAR STRATIGRAPHIC VERTICAL DEPTH

CROSS-REFERENCE TO RELATED APPLICATIONS

This application claims the benefit of priority of U.S. Provisional Patent Application Ser. No. 62/844,488, which was filed on May 7, 2019, which is incorporated herein by reference in its entirety, and claims the benefit of priority of U.S. Provisional Patent Application Ser. No. 62/985,224, which was filed on Mar. 4, 2020, which is incorporated herein by reference in its entirety, and is a continuation-in-part and claims the benefit of priority of U.S. patent application Ser. No. 16/821,397, filed on Mar. 17, 2020, which is incorporated herein by reference in its entirety.

BACKGROUND

Field of the Disclosure

The present disclosure provides systems and methods useful for integrating reference data for steering a wellbore into one or multiple geological target formations when one or multiple wells have already been drilled in the vicinity. The systems and methods can include instructions for execution on a processor and can determine the likelihood and uncertainty of a wellbore being at a particular stratigraphic vertical depth.

Description of the Related Art

Drilling a borehole for the extraction of minerals has become an increasingly complicated operation due to the increased depth and complexity of many boreholes, including the complexity added by directional drilling. Drilling is an expensive operation and errors in drilling add to the cost and, in some cases, drilling errors may permanently lower the output of a well for years into the future. Conventional technologies and methods may not adequately address the complicated nature of drilling, and may not be capable of gathering and processing various information from downhole sensors and surface control systems in a timely manner, in order to improve drilling operations and minimize drilling errors.

The determination of the well trajectory from a downhole survey may involve various calculations that depend upon reference values and measured values. However, various internal and external factors may adversely affect the downhole survey and, in turn, the determination of the well trajectory.

A subject wellbore can be steered into one or multiple geological stratigraphic targets. The directional drilling process usually follows a spatial well plan, in which the position of the desired wellbore trajectory can be given in spatial coordinates. However, the desired geological target may not be exactly at the depth assumed when creating the well plan, due to unknown lateral variations and other uncertainties in geological stratigraphy.

BRIEF DESCRIPTION OF THE DRAWINGS

For a more complete understanding of the present invention and its features and advantages, reference is now made to the following description, taken in conjunction with the accompanying drawings, in which.

SUMMARY

Figure 1:
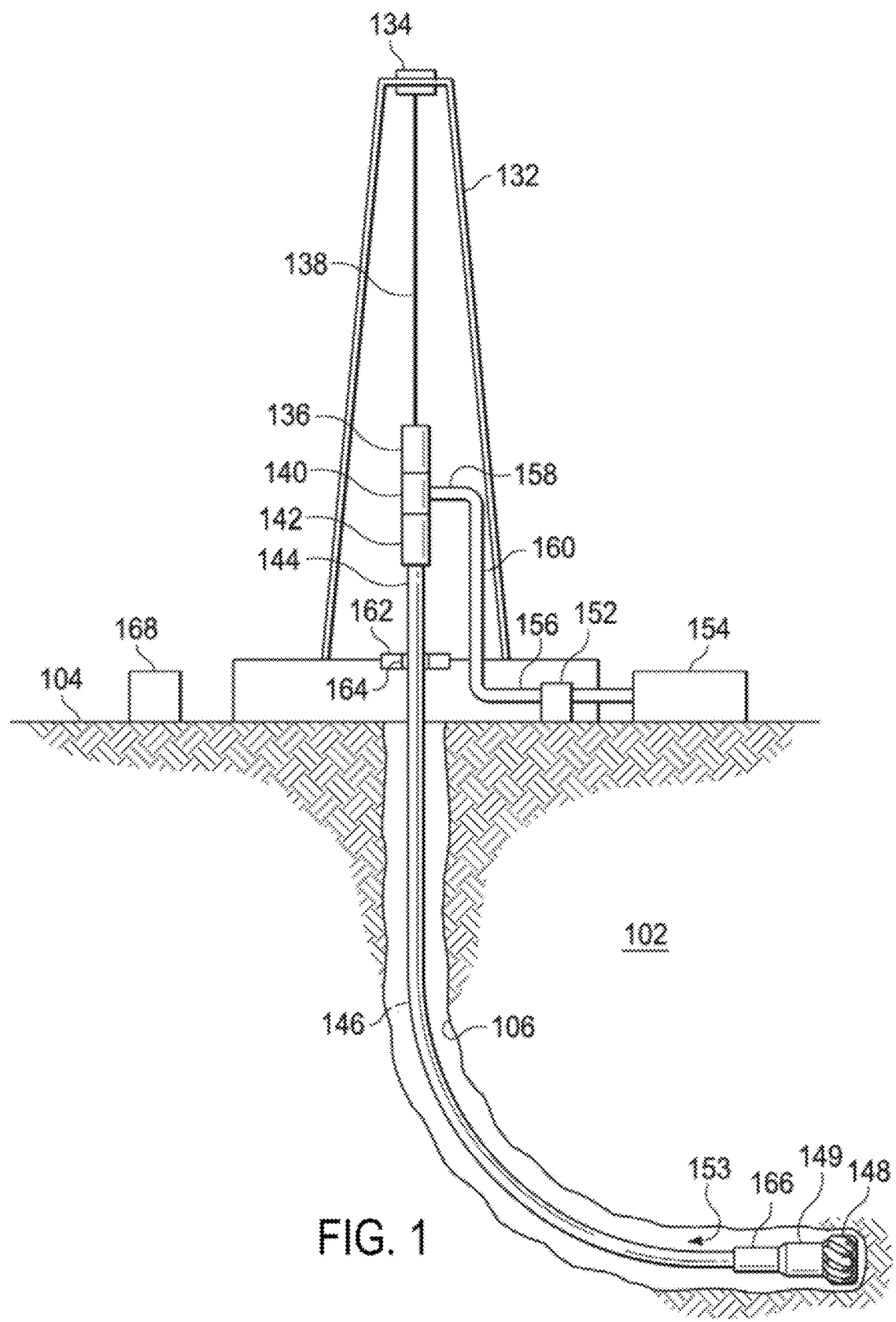
FIG. 1 is a depiction of a drilling system for drilling a borehole.

In one aspect, a computer system for performing stratigraphic analysis during drilling of a wellbore is disclosed. The computer system may include a processor enabled to access memory media storing instructions executable by the processor. The instructions may include instructions executable by the processor for, for a subject wellbore, generating a misfit curve between stratigraphic vertical depth of an offset wellbore, $SVD_{ow}$, and a measured depth of the first wellbore. Based on the misfit curve, the instructions may include instructions for calculating a plurality of likelihoods that respective target measured depths for the first subject wellbore, $TMD_{sw}$, are equal to or within a tolerance of respective SVD stratigraphic vertical depths of the subject wellbore, $SVD_{sw}$, respectively corresponding to a plurality of interpretations of stratigraphic vertical depth of the subject wellbore, $SVD_{sw}$ based on a subject well log for the subject wellbore and an offset well log respectively for the at least one offset wellbore, wherein the interpretations are paths through the misfit curve, and assigning a likelihood calculated using a starting measured depth of the subject wellbore, $MD_{sw1}$, and the target measured depth for the subject wellbore, $TMD_{sw}$, from the plurality of likelihoods that a target measured depth for the subject wellbore, $TMD_{sw}$, is equal to or within a tolerance of a stratigraphic vertical depth of the subject wellbore, associated with the target measured depth for the subject wellbore, $TMD_{sw}$.

Based on the misfit curve and the assigned likelihood, the instructions may include instructions for adjusting at least one drilling parameter during drilling of the subject wellbore.

In any of the disclosed implementations, the computer system may further comprise instructions for selecting the starting measured depth of the subject wellbore, $MD_{sw1}$, to begin the misfit curve, wherein the target measured depth for the subject wellbore, $TMD_{sw}$, is greater than the starting measured depth of the subject wellbore, $MD_{sw1}$. In the computer system, beginning with the starting measured depth of the subject wellbore, $MD_{sw1}$, the instructions for generating the misfit curve may further comprise instructions for identifying the plurality of interpretations of stratigraphic vertical depth of the subject wellbore, $SVD_{sw}$, along the subject wellbore.

In any of the disclosed implementations of the computer system, the likelihood calculated using the starting measured depth of the subject wellbore, $MD_{sw1}$, and the target measured depth for the subject wellbore, $TMD_{sw}$, may be based on a sum of an inverse function of an equation describing the misfit curve between the starting measured depth of the subject wellbore, $MD_{sw1}$, and the target measured depth for the subject wellbore, $TMD_{sw}$.

In any of the disclosed implementations of the computer system, the instructions for adjusting the at least one drilling parameter for drilling of the subject wellbore may further comprise instructions for adjusting a steering direction of the subject wellbore during drilling of the subject wellbore.

In any of the disclosed implementations of the computer system, the memory media may further comprise instructions for ordering the plurality of interpretations according to a stratigraphic vertical depth of the subject wellbore, $SVD_{sw}$, for each interpretation in the plurality of interpretations and grouping the plurality of interpretations into sets of interpretations, each set of interpretations respectively having a similar value for the stratigraphic vertical depth of the subject wellbore, $SVD_{sw}$. In the computer system, the first stratigraphic vertical depth of the subject wellbore, $SVD_{sw}$, may be determined at the target measured for the subject wellbore, $TMD_{sw}$.

In any of the disclosed implementations of the computer system, the instructions for calculating the plurality of likelihoods that respective target measured depths for the first subject wellbore, $TMD_{sw}$, are equal to or within a tolerance of respective stratigraphic vertical depths of the subject wellbore, $SVD_{sw}$, respectively corresponding to the plurality of interpretations of stratigraphic vertical depth of the subject wellbore, $SVD_{sw}$, may further comprise instructions for calculating the plurality of likelihoods that respective target measured depths for the first subject wellbore, $TMD_{sw}$, are equal to or within a tolerance of respective stratigraphic vertical depths of the subject wellbore, $SVD_{sw}$, respectively for each of the sets of interpretations.

In any of the disclosed implementations of the computer system, the memory media may further comprise instructions for, based on the plurality of likelihoods calculated using the starting measured depth of the subject wellbore, $MD_{sw1}$, and the target measured depth for the subject wellbore, $TMD_{sw}$, calculating a probability weighted average of the stratigraphic vertical depth of the subject wellbore, $SVD_{sw}$.

In any of the disclosed implementations of the computer system, the memory media may further comprise instructions for, based on the plurality of likelihoods calculated using the starting measured depth of the subject wellbore, $MD_{sw1}$, and the target measured depth for the subject wellbore, $TMD_{sw}$, calculating the stratigraphic vertical depth of the subject wellbore, $SVD_{sw}$, respectively corresponding to a maximum of the plurality of likelihoods based on the starting measured depth of the subject wellbore, $MD_{sw1}$, and the target measured depth for the subject wellbore, $TMD_{sw}$, being equal to or within a tolerance of the target measured depth for the subject wellbore, $TMD_{sw}$.

In any of the disclosed implementations of the computer system, the memory media may further comprise instructions for, based on the plurality of likelihoods calculated using the starting measured depth of the subject wellbore, $MD_{sw1}$, and the target measured depth for the subject wellbore, $TMD_{sw}$, calculating an uncertainty of the stratigraphic vertical depth of the subject wellbore, $SVD_{sw}$, respectively being equal to or within a tolerance of the target measured depth for the subject wellbore, $TMD_{sw}$.

In any of the disclosed implementations of the computer system, the memory media may further comprise instructions for calculating a path of the subject wellbore based on a likelihood calculated using minima of misfit values.

In any of the disclosed implementations of the computer system, the memory media may further comprise instructions for generating a user interface to graphically display the misfit curve.

In any of the disclosed implementations of the computer system, the memory media may further comprise instructions for, based on the sets of interpretations, extrapolating a continuous probability density function describing the plurality of likelihoods that the stratigraphic vertical depth of the subject wellbore, $SVD_{sw}$, is equal to or within a tolerance of measured depth for depths between the starting measured depth of the subject wellbore, $MD_{sw1}$, and the target measured depth for the subject wellbore, $TMD_{sw}$, calculated using the starting measured depth of the subject wellbore, $MD_{sw1}$, and the target measured depth for the subject wellbore, $TMD_{sw}$.

In another aspect, a method for performing stratigraphic analysis during drilling of a wellbore is disclosed. The method may include, for a subject wellbore, generating, by a computer system, a misfit curve between stratigraphic vertical depth of at least one offset wellbore, $SVD_{ow}$, based on the at least one offset wellbore and a measured depth of the subject wellbore, based on the misfit curve, the method may include calculating, by the computer system, a plurality of likelihoods that respective target measured depths for the first subject wellbore, $TMD_{sw}$, are equal to or within a tolerance of respective stratigraphic vertical depths of the subject wellbore, $SVD_{sw}$, respectively corresponding to a plurality of interpretations of the stratigraphic vertical depth of the subject wellbore, $SVD_{sw}$, based on a subject well log for the subject wellbore and an offset well log respectively for the at least one offset wellbore, wherein the interpretations are paths through the misfit curve, and assigning, by the computer system, a likelihood calculated using a starting measured depth of the subject wellbore, $MD_{sw1}$, and the target measured depth for the subject wellbore, $TMD_{sw}$, from the plurality of likelihoods that a target measured depth for the subject wellbore, $TMD_{sw}$, is equal to or within a tolerance of a stratigraphic vertical depth of the subject wellbore, $SVD_{sw}$, associated with the target measured depth for the subject wellbore, $TMD_{sw}$. Based on the misfit curve and the assigned likelihood, the method may include adjusting, by the computer system, at least one drilling parameter during drilling of the subject wellbore.

In any of the disclosed implementations, the method may include selecting, by the computer system, the starting measured depth of the subject wellbore, $MD_{sw1}$, to begin the misfit curve, wherein the target measured depth for the subject wellbore, $TMD_{sw}$, is greater than the starting measured depth of the subject wellbore, $MD_{sw1}$. In the method, generating the misfit curve the method may include, beginning with the starting measured depth of the subject wellbore, $MD_{sw1}$, identifying the plurality of interpretations of the stratigraphic vertical depth of the subject wellbore, $SVD_{sw}$, along the subject wellbore.

In any of the disclosed implementations of the method, the likelihood calculated using the starting measured depth of the subject wellbore, $MD_{sw1}$, and the target measured depth for the subject wellbore, $TMD_{sw}$, may be based on a sum of an inverse function of an equation describing the misfit curve between the starting measured depth of the subject wellbore, $MD_{sw1}$, and the target measured depth for the subject wellbore, $TMD_{sw}$.

In any of the disclosed implementations of the method, adjusting the at least one drilling parameter for drilling of the subject wellbore may further include adjusting, by the computer system, a steering direction of the subject wellbore during drilling of the subject wellbore.

In any of the disclosed implementations the method may further include ordering, by the computer system, the plurality of interpretations according to a stratigraphic vertical depth of the subject wellbore, $SVD_{sw}$, for each interpretation in the plurality of interpretations and grouping the plurality of interpretations into sets of interpretations, each set of interpretations respectively having a similar value for the stratigraphic vertical depth of the subject wellbore, $SVD_{sw}$. In the method, the stratigraphic vertical depth of the subject wellbore, $SVD_{sw}$, may be determined at the target measured depth.

In any of the disclosed implementations of the method, calculating the plurality of likelihoods that respective target measured depths for the first subject wellbore, $TMD_{sw}$, are equal to or within a tolerance of respective stratigraphic vertical depths of the subject wellbore, $SVD_{sw}$, respectively corresponding to the plurality of interpretations of stratigraphic vertical depth of the subject wellbore, $SVD_{sw}$, may further include calculating the plurality of likelihoods that respective target measured depths for the subject wellbore, $TMD_{sw}$, are equal to or within a tolerance of respective stratigraphic vertical depths of the subject wellbore, $SVD_{sw}$, respectively for each of the sets of interpretations.

In any of the disclosed implementations the method may further include, based on the plurality of likelihoods calculated using the starting measured depth of the subject wellbore, $MD_{sw1}$, and the target measured depth for the subject wellbore, $TMD_{sw}$, calculating, by the computer system, a probability weighted average of the stratigraphic vertical depth of the subject wellbore, $SVD_{sw}$.

In any of the disclosed implementations the method may further include, based on the plurality of likelihoods calculated using the starting measured depth of the subject wellbore, $MD_{sw1}$, and the target measured depth for the subject wellbore, $TMD_{sw}$, calculating, by the computer system, the stratigraphic vertical depth of the subject wellbore, $SVD_{sw}$, respectively corresponding to a maximum of the plurality of likelihoods calculated using the starting measured depth of the subject wellbore, $MD_{sw1}$, and the target measured depth for the subject wellbore, $TMD_{sw}$, being equal to or within a tolerance of the target measured depth for the subject wellbore, $TMD_{sw}$.

In any of the disclosed implementations the method may further include, based on the plurality of likelihoods calculated using the starting measured depth of the subject wellbore, $MD_{sw1}$, and the target measured depth for the subject wellbore, $TMD_{sw}$, calculating, by the computer system, an uncertainty of the stratigraphic vertical depth for the subject wellbore, $SVD_{sw}$, respectively being equal to or within a tolerance of the target measured depth for the subject wellbore, $TMD_{sw}$.

In any of the disclosed implementations the method may further include calculating, by the computer system, a path of the subject wellbore based on a second likelihood calculated using minima misfit values.

In any of the disclosed implementations the method may further include generating, by the computer system, a user interface to graphically display the misfit curve.

In any of the disclosed implementations the method may further include, based on the sets of interpretations, extrapolating, by the computer system, a continuous probability density function describing the plurality of likelihoods calculated using the starting measured depth of the subject wellbore, $MD_{sw1}$, and the target measured depth for the subject wellbore, $TMD_{sw}$, that the stratigraphic vertical depth of the subject wellbore, $SVD_{sw}$, is equal to or within a tolerance of measured depth for depths between the starting measured depth of the subject wellbore, $MD_{sw1}$, and the target measured depth for the subject wellbore, $TMD_{sw}$.

In a further aspect, a second computer system is disclosed. The second computer system may include a processor enabled to access memory media storing instructions executable by the processor. The instructions may include instructions for, for a subject wellbore, selecting a starting measured depth of the subject wellbore, $MD_{sw1}$, to begin a stratigraphic depth analysis. In the second computer system, the stratigraphic depth analysis may be associated with a target measured depth for the subject wellbore, $TMD_{sw}$, that is greater than the starting measured depth of the subject wellbore, $MD_{sw1}$. In the second computer system, beginning with the starting measured depth of the subject wellbore, $MD_{sw1}$, the instructions may include instructions for performing the stratigraphic depth analysis by identifying a plurality of sequences of stratigraphic vertical depth of the subject wellbore, $SVD_{sw}$, along the subject wellbore and generating a heat map curve for the subject wellbore, the heat map curve indicative of a misfit between ell log data of the subject wellbore and offset well log data indicative of stratigraphic vertical depth of at least one offset wellbore, $SVD_{ow}$, respectively, wherein the sequences are paths through the heat map curve. In the second computer system, the stratigraphic vertical depth may be determined with respect to the target measured depth. In the second computer system, the instructions may further include instructions for grouping the plurality of sequences into sets of sequences, each set of sequences respectively having a similar value for the stratigraphic vertical depth of the subject wellbore, $SVD_{sw}$, calculating a likelihood calculated using the starting measured depth of the subject wellbore, $MD_{sw1}$, and the target measured depth for the subject wellbore, $TMD_{sw}$, that the target measured depth for the subject wellbore, $TMD_{sw}$, is equal to or within a tolerance of the stratigraphic vertical depth of the subject wellbore, $SVD_{sw}$, respectively for each of the sets of sequences. In the second computer system, the likelihood may be based on a sum of an inverse function of an equation describing the misfit between the starting measured depth of the subject wellbore, $MD_{sw1}$, and the target measured depth for the subject wellbore, $TMD_{sw}$. In the second computer system, based on the likelihood calculated using the starting measured depth of the subject wellbore, $MD_{sw1}$, and the target measured depth for the subject wellbore, $TMD_{sw}$, the instructions may include instructions for adjusting a steering direction of the subject wellbore during drilling of the subject wellbore.

In any of the disclosed implementations of the second computer system, the memory media may further comprise instructions for, based on the likelihood calculated using the starting measured depth of the subject wellbore, $MD_{sw1}$, and the target measured depth for the subject wellbore, $TMD_{sw}$, calculating an uncertainty of the stratigraphic vertical depth of the subject wellbore, $SVD_{sw}$, respectively being equal to or within a tolerance of the measured depth.

In any of the disclosed implementations of the second computer system, the memory media may further comprise instructions for generating a user interface to graphically display a heat map curve indicative of the misfit between the starting measured depth of the subject wellbore, $MD_{sw1}$, and the target measured depth for the subject wellbore, $TMD_{sw}$.

In any of the disclosed implementations of the second computer system, the instructions for adjusting a steering direction of the subject wellbore may further comprise instructions for adjusting a drilling parameter used to drill the subject wellbore.

In any of the disclosed implementations of the second computer system, the memory media may further comprise instructions for, grouping the plurality of sequences into sets of sequences, each set of sequences respectively having a similar value for the stratigraphic vertical depth of the subject wellbore, $SVD_{sw}$, and, based on the sets of sequences, extrapolating a continuous probability density function of stratigraphic vertical depth of the subject wellbore, $SVD_{sw}$, for a given measured depth along the subject wellbore, the continuous probability density function describing the likelihood calculated using the starting measured depth of the subject wellbore, $MD_{sw1}$, and the target measured depth for the subject wellbore, $TMD_{sw}$, at the given measured depth.

DETAILED DESCRIPTION

In the following description, details are set forth by way of example to facilitate discussion of the disclosed subject matter. It is noted, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Drilling a well typically involves a substantial amount of human decision-making during the drilling process. For example, geologists and drilling engineers use their knowledge, experience, and the available information to make decisions on how to plan the drilling operation, how to accomplish the drilling plan, and how to handle issues that arise during drilling. However, even the best geologists and drilling engineers perform some guesswork due to the unique nature of each borehole. Furthermore, a directional human driller performing the drilling may have drilled other boreholes in the same region and so may have some similar experience. However, during drilling operations, a multitude of input information and other factors may affect a drilling decision being made by a human operator or specialist, such that the amount of information may overwhelm the cognitive ability of the human to properly consider and factor into the drilling decision. Furthermore, the quality or the error involved with the drilling decision may improve with larger amounts of input data being considered, for example, such as formation data from a large number of offset wells. For these reasons, human specialists may be unable to achieve desirable drilling decisions, particularly when such drilling decisions are made under time constraints, such as during drilling operations when continuation of drilling is dependent on the drilling decision and, thus, the entire drilling rig waits idly for the next drilling decision. Furthermore, human decision-making for drilling decisions can result in expensive mistakes, because drilling errors can add significant cost to drilling operations. In some cases, drilling errors may permanently lower the output of a well, resulting in substantial long term economic losses due to the lost output of the well.

Therefore, the well plan may be updated based on new stratigraphic information from the wellbore, as it is being drilled. This stratigraphic information can be gained on one hand from Measurement While Drilling, MWD, and Logging While Drilling, LWD, sensor data, but could also include other reference well data, such as drilling dynamics data or sensor data giving information, for example, on the hardness of the rock in individual strata layers being drilled through.

A method for updating the well plan with additional stratigraphic data may first combine the various parameters into a single characteristic function, both for the subject well and every offset well. For every pair of subject well and offset well, a heat map curve can be computed to display the misfit between the characteristic functions of the subject and offset wells. The heat map curves may then enable the identification of paths (x(MD), y(MD)), parameterized by the measured depth, MD, along the subject well. These paths uniquely describe the vertical depth of the subject well relative to the geology (e.g., formation) at every offset well. Alternatively, the characteristic functions of the offset wells can be combined into a single characteristic function at the location of the subject wellbore. This combined characteristic function changes along the subject well with changes in the stratigraphy. The heat map curve may also be used to identify stratigraphic anomalies, such as structural faults, stringers and breccia. The identified paths may be used in updating the well plan with the latest data to steer the wellbore into the geological target(s) and keep the wellbore in the target zone.

Referring now to the drawings, Referring to FIG. 1, a drilling system 100 is illustrated in one embodiment as a top drive system. As shown, the drilling system 100 includes a derrick 132 on the surface 104 of the earth and is used to drill a borehole 106 into the earth. Typically, drilling system 100 is used at a location corresponding to a geographic formation 102 in the earth that is known.

In FIG. 1, derrick 132 includes a crown block 134 to which a traveling block 136 is coupled via a drilling line 138. In drilling system 100, a top drive 140 is coupled to traveling block 136 and may provide rotational force for drilling. A saver sub 142 may sit between the top drive 140 and a drill pipe 144 that is part of a drill string 146. Top drive 140 may rotate drill string 146 via the saver sub 142, which in turn may rotate a drill bit 148 of a bottom hole assembly, BHA, 149 in borehole 106 passing through formation 102. Also visible in drilling system 100 is a rotary table 162 that may be fitted with a master bushing 164 to hold drill string 146 when not rotating.

A mud pump 152 may direct a fluid mixture 153 (e.g., a mud mixture) from a mud pit 154 into drill string 146. Mud pit 154 is shown schematically as a container, but it is noted that various receptacles, tanks, pits, or other containers may be used. Mud 153 may flow from mud pump 152 into a discharge line 156 that is coupled to a rotary hose 158 by a standpipe 160. Rotary hose 158 may then be coupled to top drive 140, which includes a passage for mud 153 to flow into borehole 106 via drill string 146 from where mud 153 may emerge at drill bit 148. Mud 153 may lubricate drill bit 148 during drilling and, due to the pressure supplied by mud pump 152, mud 153 may return via borehole 106 to surface 104.

In drilling system 100, drilling equipment (see also FIG. 5) is used to perform the drilling of borehole 106, such as top drive 140 (or rotary drive equipment) that couples to drill string 146 and bottom hole assembly, BHA 149 and is configured to rotate drill string 146 and apply pressure to drill bit 148. Drilling system 100 may include control systems such as a weight-on-bit, WOB/differential pressure control system 522, a positional/rotary control system 524, a fluid circulation control system 526, and a sensor system 528, as further described below with respect to FIG. 5. The control systems may be used to monitor and change drilling rig settings, such as the weight-on-bit, WOB, or differential pressure to alter the rate of penetration, ROP, or the radial orientation of the toolface, change the flow rate of drilling mud, and perform other operations. Sensor system 528 may be for obtaining sensor data about the drilling operation and drilling system 100, including the downhole equipment. For example, sensor system 528 may include measurement while drilling, MWD, or logging while drilling, LWD, tools for acquiring information, such as toolface and formation logging information, that may be saved for later retrieval, transmitted with or without a delay using any of various communication means (e.g., wireless, wireline, or mud pulse telemetry), or otherwise transferred to steering control system 168. As used herein, a measurement while drilling, MWD, tool is enabled to communicate downhole measurements without substantial delay to the surface 104, such as using mud pulse telemetry, while a logging while drilling, LWD, tool is equipped with an internal memory that stores measurements when downhole and can be used to download a stored log of measurements when the logging while drilling, LWD, tool is at the surface 104. The internal memory in the logging while drilling, LWD, tool may be a removable memory, such as a universal serial bus (USB) memory device or another removable memory device. It is noted that certain downhole tools may have both measurement while drilling, MWD and logging while drilling, LWD, capabilities. Such information acquired by sensor system 528 may include information related to hole depth, bit depth, inclination angle, azimuth angle, true vertical depth, gamma count, standpipe pressure, mud flow rate, rotary rotations per minute, RPM bit speed, rate of penetration, ROP, weight-on-bit, WOB, among other information. It is noted that all or part of sensor system 528 may be incorporated into a control system, or in another component of the drilling equipment. As drilling system 100 can be configured in many different implementations, it is noted that different control systems and subsystems may be used.

Sensing, detection, measurement, evaluation, storage, alarm, and other functionality may be incorporated into a downhole tool 166 or bottom hole assembly, BHA 149 or elsewhere along drill string 146 to provide downhole surveys of borehole 106. Accordingly, downhole tool 166 may be a measurement while drilling, MWD tool or a logging while drilling, LWD, tool or both, and may accordingly utilize connectivity to the surface 104, local storage, or both. In different implementations, gamma radiation sensors, magnetometers, accelerometers, and other types of sensors may be used for the downhole surveys. Although downhole tool 166 is shown in singular in drilling system 100, it is noted that multiple instances (not shown) of downhole tool 166 may be located at one or more locations along drill string 146.

In some embodiments, formation detection and evaluation functionality may be provided via a steering control system 168 on the surface 104. Steering control system 168 may be located in proximity to derrick 132 or may be included with drilling system 100. In other embodiments, steering control system 168 may be remote from the actual location of borehole 106 (see also FIG. 4). For example, steering control system 168 may be a stand-alone system or may be incorporated into other systems included with drilling system 100.

In operation, steering control system 168 may be accessible via a communication network (see also FIG. 10), and may accordingly receive formation information via the communication network. In some embodiments, steering control system 168 may use the evaluation functionality to provide corrective measures, such as a convergence plan to overcome an error in the well trajectory of borehole 106 with respect to a reference, or a planned well trajectory. The convergence plans or other corrective measures may depend on a determination of the well trajectory, and therefore, may be improved in accuracy using surface steering, as disclosed herein.

In particular embodiments, at least a portion of steering control system 168 may be located in downhole tool 166 (not shown). In some embodiments, steering control system 168 may communicate with a separate controller (not shown) located in downhole tool 166. In particular, steering control system 168 may receive and process measurements received from downhole surveys, and may perform the calculations described herein for surface steering using the downhole surveys and other information referenced herein.

In drilling system 100, to aid in the drilling process, data is collected from borehole 106, such as from sensors in bottom hole assembly, BHA 149, downhole tool 166, or both. The collected data may include the geological characteristics of formation 102 in which borehole 106 was formed, the attributes of drilling system 100, including bottom hole assembly, BHA 149, and drilling information such as weight-on-bit, WOB, drilling speed, and other information pertinent to the formation of borehole 106. The drilling information may be associated with a particular depth or another identifiable marker to index collected data. For example, the collected data for borehole 106 may capture drilling information indicating that drilling of the well from 1,000 feet to 1,200 feet occurred at a first rate of penetration, ROP, through a first rock layer with a first weight-on-bit, WOB, while drilling from 1,200 feet to 1,500 feet occurred at a second rate of penetration, ROP, through a second rock layer with a second weight-on-bit, WOB (see also FIG. 2). In some applications, the collected data may be used to virtually recreate the drilling process that created borehole 106 in formation 102, such as by displaying a computer simulation of the drilling process. The accuracy with which the drilling process can be recreated depends on a level of detail and accuracy of the collected data, including collected data from a downhole survey of the well trajectory.

The collected data may be stored in a database that is accessible via a communication network for example. In some embodiments, the database storing the collected data for borehole 106 may be located locally at drilling system 100, at a drilling hub that supports a plurality of drilling systems 100 in a region, or at a database server accessible over the communication network that provides access to the database (see also FIG. 4). At drilling system 100, the collected data may be stored at the surface 104 or downhole in drill string 146, such as in a memory device included with bottom hole assembly, BHA 149 (see also FIG. 10). Alternatively, at least a portion of the collected data may be stored on a removable storage medium, such as using steering control system 168 or bottom hole assembly, BHA 149, that is later coupled to the database in order to transfer the collected data to the database, which may be manually performed at certain intervals, for example.

In FIG. 1, steering control system 168 is located at or near the surface 104 where borehole 106 is being drilled. Steering control system 168 may be coupled to equipment used in drilling system 100 and may also be coupled to the database, whether the database is physically located locally, regionally, or centrally (see also FIGS. 4 and 5). Accordingly, steering control system 168 may collect and record various inputs, such as measurement data from a magnetometer and an accelerometer that may also be included with bottom hole assembly, BHA 149.

Steering control system 168 may further be used as a surface steerable system, along with the database, as described above. The surface steerable system may enable an operator to plan and control drilling operations while drilling is being performed. The surface steerable system may itself also be used to perform certain drilling operations, such as controlling certain control systems that, in turn, control the actual equipment in drilling system 100 (see also FIG. 5). The control of drilling equipment and drilling operations by steering control system 168 may be manual, manual-assisted, semi-automatic, or automatic, in different embodiments.

Manual control may involve direct control of the drilling rig equipment, albeit with certain safety limits to prevent unsafe or undesired actions or collisions of different equipment. To enable manual-assisted control, steering control system 168 may present various information, such as using a graphical user interface, GUI, displayed on a display device (see FIG. 8), to a human operator, and may provide controls that enable the human operator to perform a control operation. The information presented to the user may include live measurements and feedback from the drilling rig and steering control system 168, or the drilling rig itself, and may further include limits and safety-related elements to prevent unwanted actions or equipment states, in response to a manual control command entered by the user using the graphical user interface, GUI.

To implement semi-automatic control, steering control system 168 may itself propose or indicate to the user, such as via the graphical user interface, GUI, that a certain control operation, or a sequence of control operations, should be performed at a given time. Then, steering control system 168 may enable the user to imitate the indicated control operation or sequence of control operations, such that once manually started, the indicated control operation or sequence of control operations is automatically completed. The limits and safety features mentioned above for manual control would still apply for semi-automatic control. It is noted that steering control system 168 may execute semi-automatic control using a secondary processor, such as an embedded controller that executes under a real-time operating system, RTOS that is under the control and command of steering control system 168. To implement automatic control, the step of manual starting the indicated control operation or sequence of operations is eliminated, and steering control system 168 may proceed with only a passive notification to the user of the actions taken.

In order to implement various control operations, steering control system 168 may perform (or may cause to be performed) various input operations, processing operations, and output operations. The input operations performed by steering control system 168 may result in measurements or other input information being made available for use in any subsequent operations, such as processing or output operations. The input operations may accordingly provide the input information, including feedback from the drilling process itself, to steering control system 168. The processing operations performed by steering control system 168 may be any processing operation associated with surface steering, as disclosed herein. The output operations performed by steering control system 168 may involve generating output information for use by external entities, or for output to a user, such as in the form of updated elements in the graphical user interface, GUI, for example. The output information may include at least some of the input information, enabling steering control system 168 to distribute information among various entities and processors.

In particular, the operations performed by steering control system 168 may include operations such as receiving drilling data representing a drill path, receiving other drilling parameters, calculating a drilling solution for the drill path based on the received data and other available data (e.g., rig characteristics), implementing the drilling solution at the drilling rig, monitoring the drilling process to gauge whether the drilling process is within a defined margin of error of the drill path, and calculating corrections for the drilling process if the drilling process is outside of the margin of error.

Accordingly, steering control system 168 may receive input information either before drilling, during drilling, or after drilling of borehole 106. The input information may comprise measurements from one or more sensors, as well as survey information collected while drilling borehole 106. The input information may also include a well plan, a regional formation history, drilling engineer parameters, downhole tool face/inclination information, downhole tool gamma/resistivity information, economic parameters, reliability parameters, among various other parameters. Some of the input information, such as the regional formation history, may be available from a drilling hub 410, which may have respective access to a regional drilling database, DB, 412 (see FIG. 4). Other input information may be accessed or uploaded from other sources to steering control system 168. For example, a web interface may be used to interact directly with steering control system 168 to upload the well plan or drilling parameters.

As noted, the input information may be provided to steering control system 168. After processing by steering control system 168, steering control system 168 may generate control information that may be output to drilling rig 210 (e.g., to rig controls 520 that control drilling equipment 530, see also FIGS. 2 and 5). Drilling rig 210 may provide feedback information using rig controls 520 to steering control system 168. The feedback information may then serve as input information to steering control system 168, thereby enabling steering control system 168 to perform feedback loop control and validation. Accordingly, steering control system 168 may be configured to modify its output information to the drilling rig, in order to achieve the desired results, which are indicated in the feedback information. The output information generated by steering control system 168 may include indications to modify one or more drilling parameters, the direction of drilling, the drilling mode, among others. In certain operational modes, such as semi-automatic or automatic, steering control system 168 may generate output information indicative of instructions to rig controls 520 to enable automatic drilling using the latest location of bottom hole assembly, BHA 149. Therefore, an improved accuracy in the determination of the location of bottom hole assembly, BHA 149 may be provided using steering control system 168, along with the methods and operations for surface steering disclosed herein.

Figure 2:
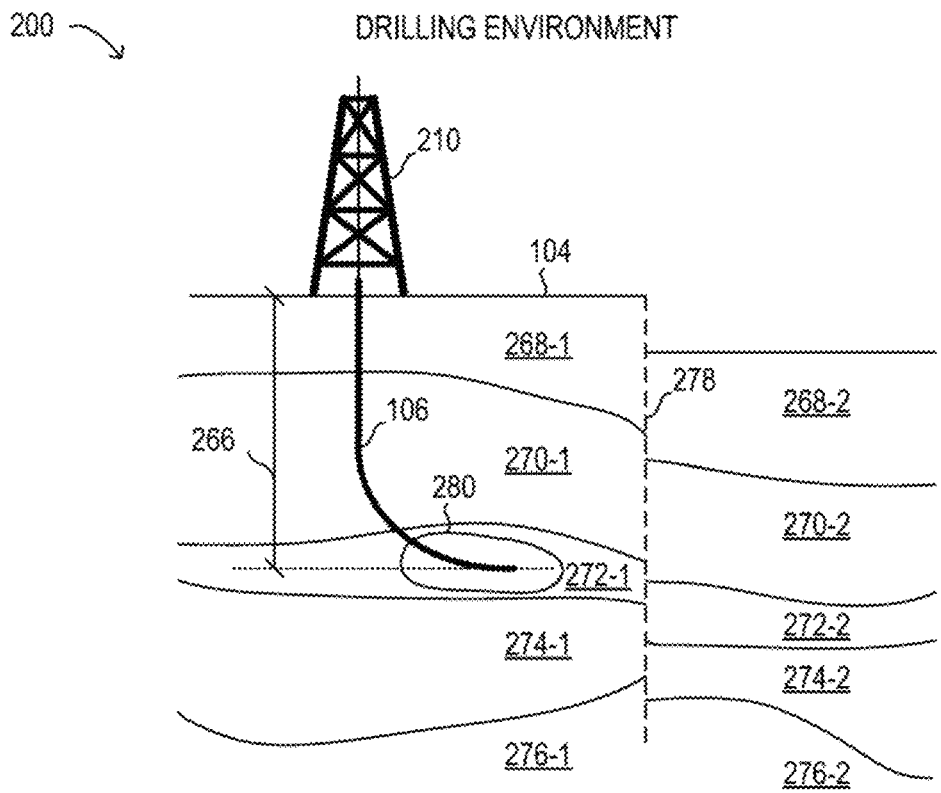
FIG. 2 is a depiction of a drilling environment including the drilling system for drilling a borehole.

Referring now to FIG. 2, a drilling environment 200 is depicted schematically and is not drawn to scale or perspective. In particular, drilling environment 200 may illustrate additional details with respect to formation 102 below the surface 104 in drilling system 100 shown in FIG. 1. In FIG. 2, drilling rig 210 may represent various equipment discussed above with respect to drilling system 100 in FIG. 1 that is located at the surface 104.

In drilling environment 200, it may be assumed that a drilling plan (also referred to as a well plan) has been formulated to drill borehole 106 extending into the ground to a true vertical depth, TVD 266 and penetrating several subterranean strata layers. Borehole 106 is shown in FIG. 2 extending through strata layers 268-1 and 270-1, while terminating in strata layer 272-1. Accordingly, as shown, borehole 106 does not extend or reach underlying strata layers 274-1 and 276-1. A target area 280 specified in the drilling plan may be located in strata layer 272-1 as shown in FIG. 2. Target area 280 may represent a desired endpoint of borehole 106, such as a hydrocarbon producing area indicated by strata layer 272-1. It is noted that target area 280 may be of any shape and size, and may be defined using various different methods and information in different embodiments. In some instances, target area 280 may be specified in the drilling plan using subsurface coordinates, or references to certain markers, that indicate where borehole 106 is to be terminated. In other instances, target area may be specified in the drilling plan using a depth range within which borehole 106 is to remain. For example, the depth range may correspond to strata layer 272-1. In other examples, target area 280 may extend as far as can be realistically drilled. For example, when borehole 106 is specified to have a horizontal section with a goal to extend into strata layer 172 as far as possible, target area 280 may be defined as strata layer 272-1 itself and drilling may continue until some other physical limit is reached, such as a property boundary or a physical limitation to the length of the drill string.

Also visible in FIG. 2 is a fault line 278 that has resulted in a subterranean discontinuity in the fault structure. Specifically, strata layers 268, 270, 272, 274, and 276 have portions on either side of fault line 278. On one side of fault line 278, where borehole 106 is located, strata layers 268-1, 270-1, 272-1, 274-1, and 276-1 are unshifted by fault line 278. On the other side of fault line 278, strata layers 268-2, 270-3, 272-3, 274-3, and 276-3 are shifted downwards by fault line 278.

Current drilling operations frequently include directional drilling to reach a target, such as target area 280. The use of directional drilling has been found to generally increase an overall amount of production volume per well, but also may lead to significantly higher production rates per well, which are both economically desirable. As shown in FIG. 2, directional drilling may be used to drill the horizontal portion of borehole 106, which increases an exposed length of borehole 106 within strata layer 272-1, and which may accordingly be beneficial for hydrocarbon extraction from strata layer 272-1. Directional drilling may also be used alter an angle of borehole 106 to accommodate subterranean faults, such as indicated by fault line 278 in FIG. 2. Other benefits that may be achieved using directional drilling include sidetracking off of an existing well to reach a different target area or a missed target area, drilling around abandoned drilling equipment, drilling into otherwise inaccessible or difficult to reach locations (e.g., under populated areas or bodies of water), providing a relief well for an existing well, and increasing the capacity of a well by branching off and having multiple boreholes extending in different directions or at different vertical positions for the same well. Directional drilling is often not limited to a straight horizontal borehole 106, but may involve staying within a strata layer that varies in depth and thickness as illustrated by strata layer 172. As such, directional drilling may involve multiple vertical adjustments that complicate the trajectory of borehole 106.

Figure 3:
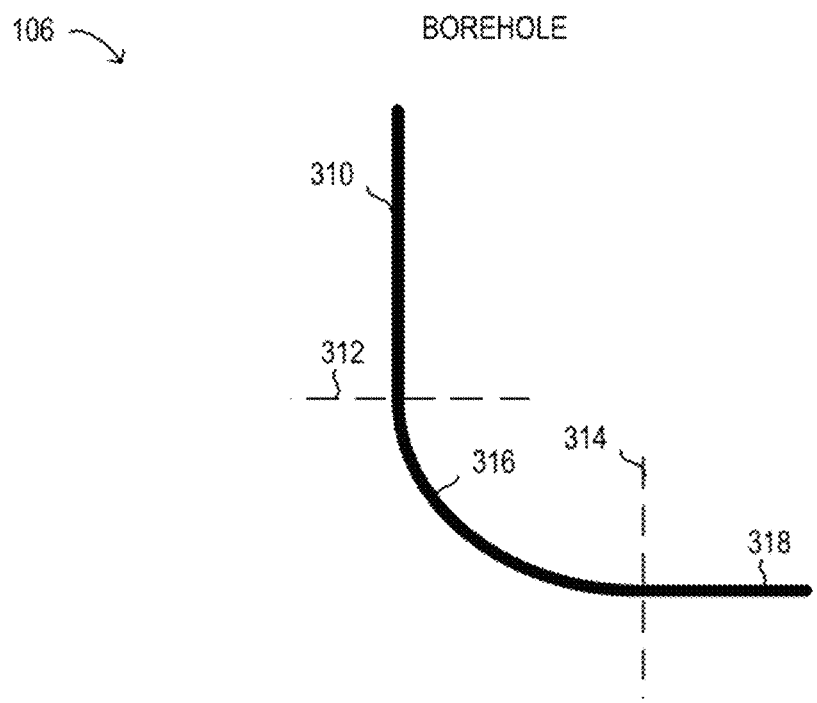
FIG. 3 is a depiction of a borehole generated in the drilling environment.

Referring now to FIG. 3, one embodiment of a portion of borehole 106 is shown in further detail. Using directional drilling for horizontal drilling may introduce certain challenges or difficulties that may not be observed during vertical drilling of borehole 106. For example, a horizontal portion 318 of borehole 106 may be started from a vertical portion 310. In order to make the transition from vertical to horizontal, a curve may be defined that specifies a so-called "build up" section 316. Build up section 316 may begin at a kick off point 312 in vertical portion 310 and may end at a begin point 314 of horizontal portion 318. The change in inclination in build up section 316 per measured length drilled is referred to herein as a "build rate" and may be defined in degrees per one hundred feet drilled. For example, the build rate may have a value of 6°/100 ft., indicating that there is a six degree change in inclination for every one hundred feet drilled. The build rate for a particular build up section may remain relatively constant or may vary.

The build rate used for any given build up section may depend on various factors, such as properties of the formation (i.e., strata layers) through which borehole 106 is to be drilled, the trajectory of borehole 106, the particular pipe and drill collars/bottom hole assembly, BHA, components used (e.g., length, diameter, flexibility, strength, mud motor bend setting, and drill bit), the mud type and flow rate, the specified horizontal displacement, stabilization, and inclination, among other factors. An overly aggressive built rate can cause problems such as severe doglegs (e.g., sharp changes in direction in the borehole) that may make it difficult or impossible to run casing or perform other operations in borehole 106. Depending on the severity of any mistakes made during directional drilling, borehole 106 may be enlarged or drill bit 146 may be backed out of a portion of borehole 106 and redrilled along a different path. Such mistakes may be undesirable due to the additional time and expense involved. However, if the built rate is too cautious, additional overall time may be added to the drilling process, because directional drilling generally involves a lower rate of penetration, ROP, than straight drilling. Furthermore, directional drilling for a curve is more complicated than vertical drilling and the possibility of drilling errors increases with directional drilling (e.g., overshoot and undershoot that may occur while trying to keep drill bit 148 on the planned trajectory).

Two modes of drilling, referred to herein as "rotating" and "sliding", are commonly used to form borehole 106. Rotating, also called "rotary drilling", uses top drive 140 or rotary table 162 to rotate drill string 146. Rotating may be used when drilling occurs along a straight trajectory, such as for vertical portion 310 of borehole 106. Sliding, also called "steering" or "directional drilling" as noted above, typically uses a mud motor located downhole at bottom hole assembly, BHA 149. The mud motor may have an adjustable bent housing and is not powered by rotation of the drill string. Instead, the mud motor uses hydraulic power derived from the pressurized drilling mud that circulates along borehole 106 to and from the surface 104 to directionally drill borehole 106 in build up section 316.

Thus, sliding is used in order to control the direction of the well trajectory during directional drilling. A method to perform a slide may include the following operations. First, during vertical or straight drilling, the rotation of drill string 146 is stopped. Based on feedback from measuring equipment, such as from downhole tool 166, adjustments may be made to drill string 146, such as using top drive 140 to apply various combinations of torque, weight-on-bit, WOB, and vibration, among other adjustments. The adjustments may continue until a tool face is confirmed that indicates a direction of the bend of the mud motor is oriented to a direction of a desired deviation (i.e., build rate) of borehole 106. Once the desired orientation of the mud motor is attained, weight-on-bit, WOB, to the drill bit is increased, which causes the drill bit to move in the desired direction of deviation. Once sufficient distance and angle have been built up in the curved trajectory, a transition back to rotating mode can be accomplished by rotating the drill string again. The rotation of the drill string after sliding may neutralize the directional deviation caused by the bend in the mud motor due to the continuous rotation around a centerline of borehole 106.

Figure 4:
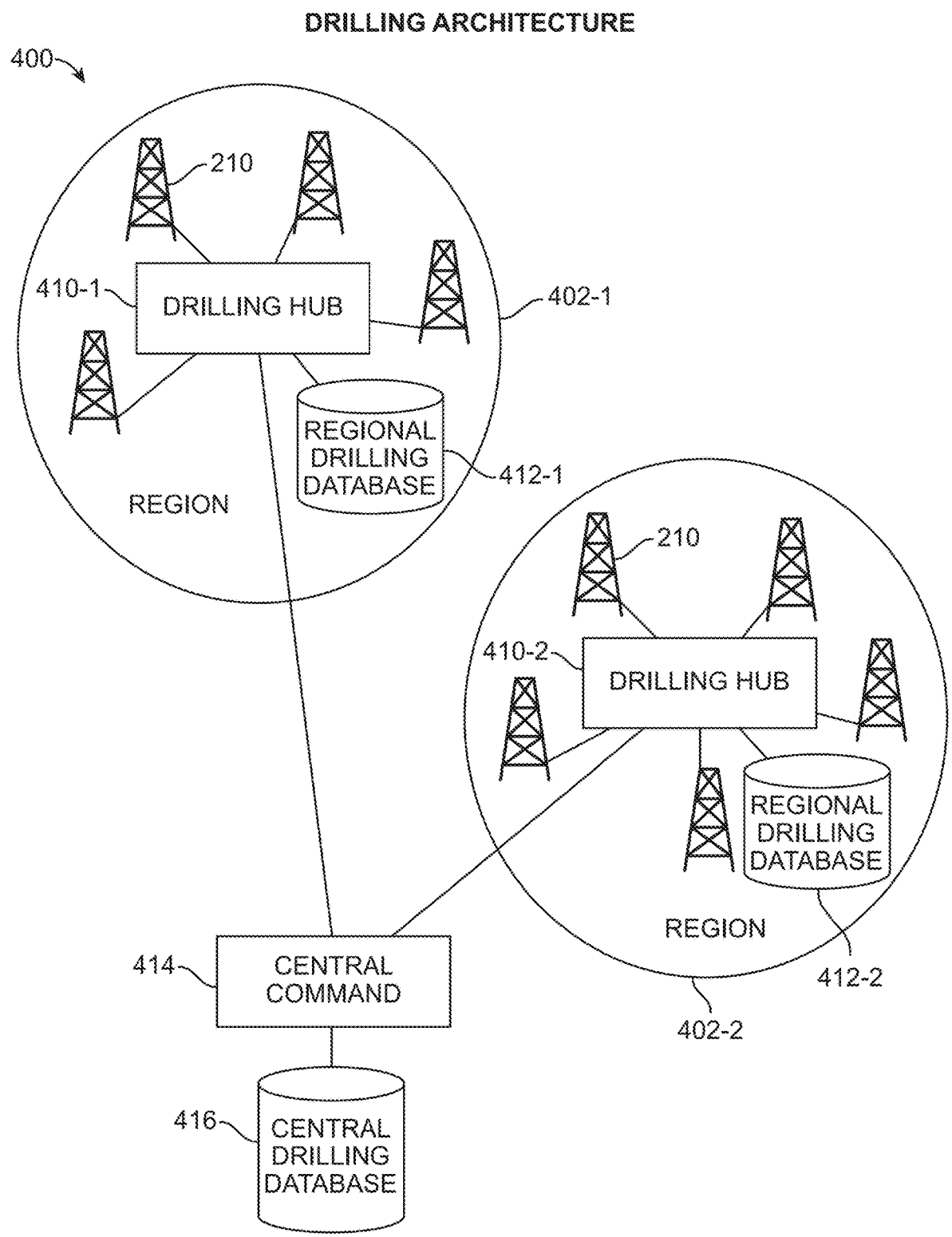
FIG. 4 is a depiction of a drilling architecture including the drilling environment.

Referring now to FIG. 4, a drilling architecture 400 is illustrated in diagram form. As shown, drilling architecture 400 depicts a hierarchical arrangement of drilling hubs 410 and a central command 414, to support the operation of a plurality of drilling rigs 210 in different regions 402. Specifically, as described above with respect to FIGS. 1 and 2, drilling rig 210 includes steering control system 168 that is enabled to perform various drilling control operations locally to drilling rig 210. When steering control system 168 is enabled with network connectivity, certain control operations or processing may be requested or queried by steering control system 168 from a remote processing resource. As shown in FIG. 4, drilling hubs 410 represent a remote processing resource for steering control system 168 located at respective regions 402, while central command 414 may represent a remote processing resource for both drilling hub 410 and steering control system 168.

Specifically, in a region 401-1, a drilling hub 410-1 may serve as a remote processing resource for drilling rigs 210 located in region 401-1, which may vary in number and are not limited to the exemplary schematic illustration of FIG. 4. Additionally, drilling hub 410-1 may have access to a regional drilling database, DB 412-1, which may be local to drilling hub 410-1. Additionally, in a region 401-2, a drilling hub 410-2 may serve as a remote processing resource for drilling rigs 210 located in region 401-2, which may vary in number and are not limited to the exemplary schematic illustration of FIG. 4. Additionally, drilling hub 410-2 may have access to a regional drilling database, DB 412-2, which may be local to drilling hub 410-2.

In FIG. 4, respective regions 402 may exhibit the same or similar geological formations. Thus, reference wells, or offset wells, may exist in a vicinity of a given drilling rig 210 in region 402, or where a new well is planned in region 402. Furthermore, multiple drilling rigs 210 may be actively drilling concurrently in region 402, and may be in different stages of drilling through the depths of formation strata layers at region 402. Thus, for any given well being drilled by drilling rig 210 in a region 402, survey data from the reference wells or offset wells may be used to create the well plan, and may be used for surface steering, as disclosed herein. In some implementations, survey data or reference data from a plurality of reference wells may be used to improve drilling performance, such as by reducing an error in estimating true vertical depth, TVD or a position of bottom hole assembly, BHA 149 relative to one or more strata layers, as will be described in further detail herein. Additionally, survey data from recently drilled wells, or wells still currently being drilled, including the same well, may be used for reducing an error in estimating true vertical depth, TVD or a position of bottom hole assembly, BHA 149 relative to one or more strata layers.

Also shown in FIG. 4 is central command 414, which has access to central drilling database, DB 416, and may be located at a centralized command center that is in communication with drilling hubs 410 and drilling rigs 210 in various regions 402. The centralized command center may have the ability to monitor drilling and equipment activity at any one or more drilling rigs 210. In some embodiments, central command 414 and drilling hubs 412 may be operated by a commercial operator of drilling rigs 210 as a service to customers who have hired the commercial operator to drill wells and provide other drilling-related services.

In FIG. 4, it is particularly noted that central drilling database, DB 416 may be a central repository that is accessible to drilling hubs 410 and drilling rigs 210. Accordingly, central drilling database, DB 416 may store information for various drilling rigs 210 in different regions 402. In some embodiments, central drilling database, DB 416 may serve as a backup for at least one regional drilling database, DB 412, or may otherwise redundantly store information that is also stored on at least one regional drilling database, DB 412. In turn, regional drilling database, DB 412 may serve as a backup or redundant storage for at least one drilling rig 210 in region 402. For example, regional drilling database, DB 412 may store information collected by steering control system 168 from drilling rig 210.

In some embodiments, the formulation of a drilling plan for drilling rig 210 may include processing and analyzing the collected data in regional drilling database, DB 412 to create a more effective drilling plan. Furthermore, once the drilling has begun, the collected data may be used in conjunction with current data from drilling rig 210 to improve drilling decisions. As noted, the functionality of steering control system 168 may be provided at drilling rig 210, or may be provided, at least in part, at a remote processing resource, such as drilling hub 410 or central command 414.

As noted, steering control system 168 may provide functionality as a surface steerable system for controlling drilling rig 210. Steering control system 168 may have access to regional drilling database, DB 412 and central drilling database, DB 416 to provide the surface steerable system functionality. As will be described in greater detail below, steering control system 168 may be used to plan and control drilling operations based on input information, including feedback from the drilling process itself. Steering control system 168 may be used to perform operations such as receiving drilling data representing a drill trajectory and other drilling parameters, calculating a drilling solution for the drill trajectory based on the received data and other available data (e.g., rig characteristics), implementing the drilling solution at drilling rig 210, monitoring the drilling process to gauge whether the drilling process is within a margin of error that is defined for the drill trajectory, or calculating corrections for the drilling process if the drilling process is outside of the margin of error.

Figure 5:
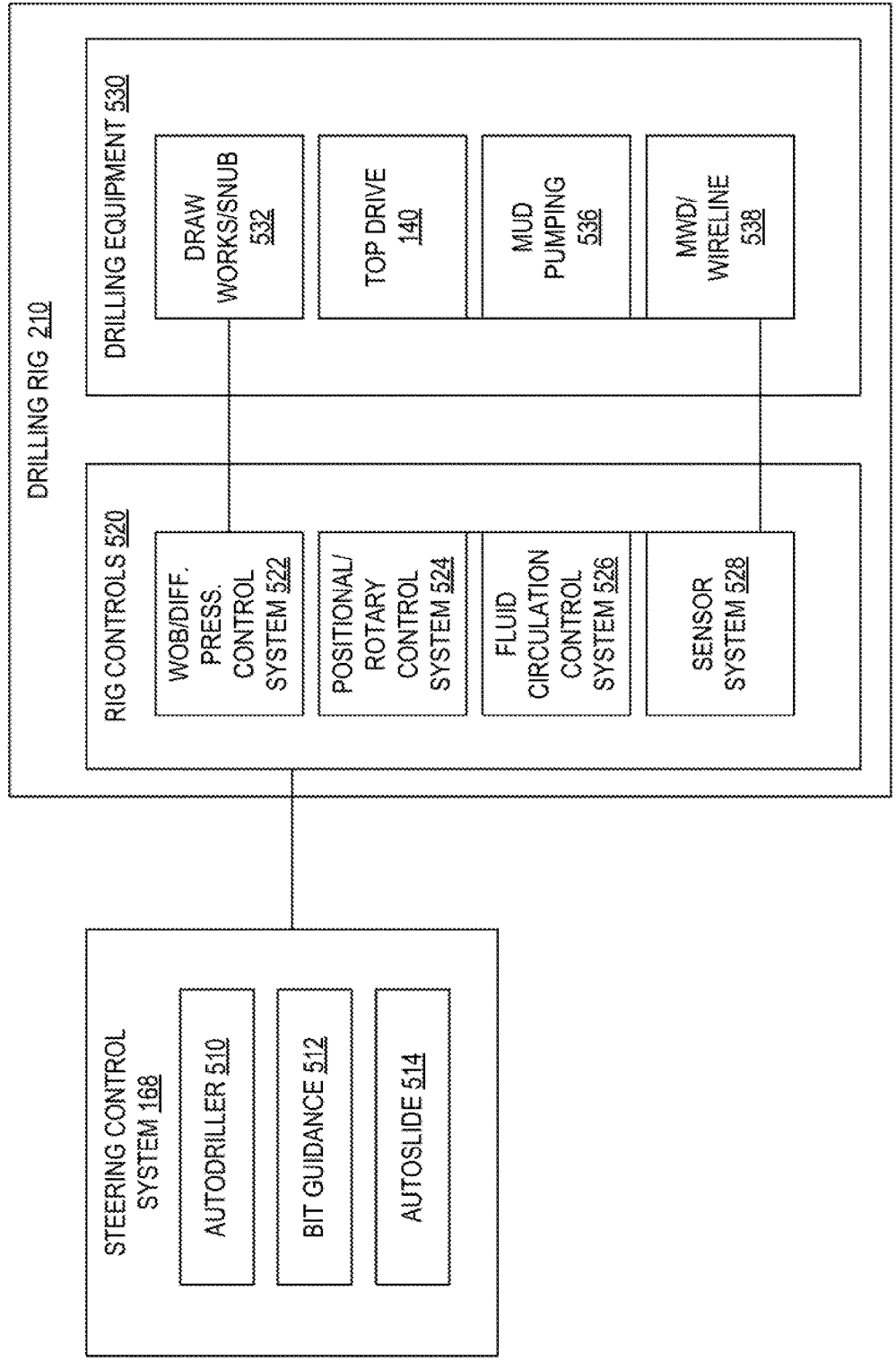
FIG. 5 is a depiction of rig control systems included in the drilling system.

Referring now to FIG. 5, an example of rig control systems 500 is illustrated in schematic form. It is noted that rig control systems 500 may include fewer or more elements than shown in FIG. 5 in different embodiments. As shown, rig control systems 500 includes steering control system 168 and drilling rig 210. Specifically, steering control system 168 is shown with logical functionality including an autodriller 510, a bit guidance 512, and an autoslide 514. Drilling rig 210 is hierarchically shown including rig controls 520, which provide secure control logic and processing capability, along with drilling equipment 530, which represents the physical equipment used for drilling at drilling rig 210. As shown, rig controls 520 include weight-on-bit, WOB/differential pressure control system 522, positional/rotary control system 524, fluid circulation control system 526, and sensor system 528, while drilling equipment 530 includes a draw works/snub 532, top drive 140, a mud pumping 536, and a measurement while drilling, MWD/wireline 538.

Figure 10:
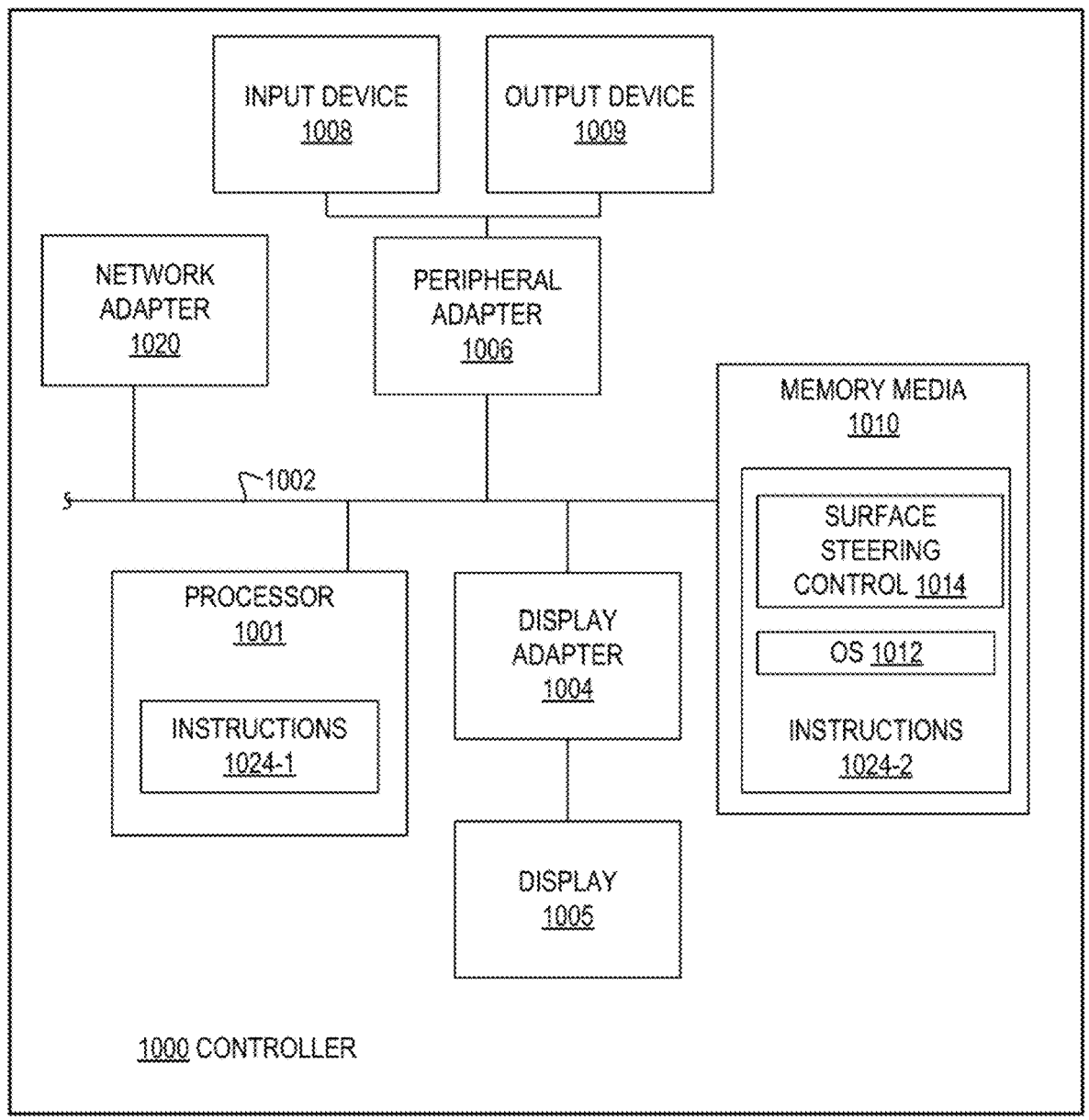
FIG. 10 is a depiction of a controller usable by the rig control systems.

Steering control system 168 represent an instance of a processor having an accessible memory storing instructions executable by the processor, such as an instance of controller 1000 shown in FIG. 10. Also, weight-on-bit, WOB/differential pressure control system 522, positional/rotary control system 524, and fluid circulation control system 526 may each represent an instance of a processor having an accessible memory storing instructions executable by the processor, such as an instance of controller 1000 shown in FIG. 10, but for example, in a configuration as a programmable logic controller, PLC, that may not include a user interface but may be used as an embedded controller. Accordingly, it is noted that each of the systems included in rig controls 520 may be a separate controller, such as a programmable logic controller, PLC, and may autonomously operate, at least to a degree. Steering control system 168 may represent hardware that executes instructions to implement a surface steerable system that provides feedback and automation capability to an operator, such as a driller. For example, steering control system 168 may cause autodriller 510, bit guidance 512 (also referred to as a bit guidance system (BGS)), and autoslide 514 (among others, not shown) to be activated and executed at an appropriate time during drilling. In particular implementations, steering control system 168 may be enabled to provide a user interface during drilling, such as the user interface 850 depicted and described below with respect to FIG. 8. Accordingly, steering control system 168 may interface with rig controls 520 to facilitate manual, assisted manual, semi-automatic, and automatic operation of drilling equipment 530 included in drilling rig 210. It is noted that rig controls 520 may also accordingly be enabled for manual or user-controlled operation of drilling, and may include certain levels of automation with respect to drilling equipment 530.

In rig control systems 500 of FIG. 5, weight-on-bit, WOB/differential pressure control system 522 may be interfaced with draw works/snubbing unit 532 to control weight-on-bit, WOB, of drill string 146. Positional/rotary control system 524 may be interfaced with top drive 140 to control rotation of drill string 146. Fluid circulation control system 526 may be interfaced with mud pumping 536 to control mud flow and may also receive and decode mud telemetry signals. Sensor system 528 may be interfaced with measurement while drilling, MWD/wireline 538, which may represent various bottom hole assembly, BHA, sensors and instrumentation equipment, among other sensors that may be downhole or at the surface.

In rig control systems 500, autodriller 510 may represent an automated rotary drilling system and may be used for controlling rotary drilling. Accordingly, autodriller 510 may enable automate operation of rig controls 520 during rotary drilling, as indicated in the well plan. Bit guidance 512 may represent an automated control system to monitor and control performance and operation drilling bit 148.

In rig control systems 500, autoslide 514 may represent an automated slide drilling system and may be used for controlling slide drilling. Accordingly, autoslide 514 may enable automate operation of rig controls 520 during a slide, and may return control to steering control system 168 for rotary drilling at an appropriate time, as indicated in the well plan. In particular implementations, autoslide 514 may be enabled to provide a user interface during slide drilling to specifically monitor and control the slide. For example, autoslide 514 may rely on bit guidance 512 for orienting a tool face and on autodriller 510 to set weight-on-bit, WOB, or control rotation or vibration of drill string 146.

Figures 6, 7:
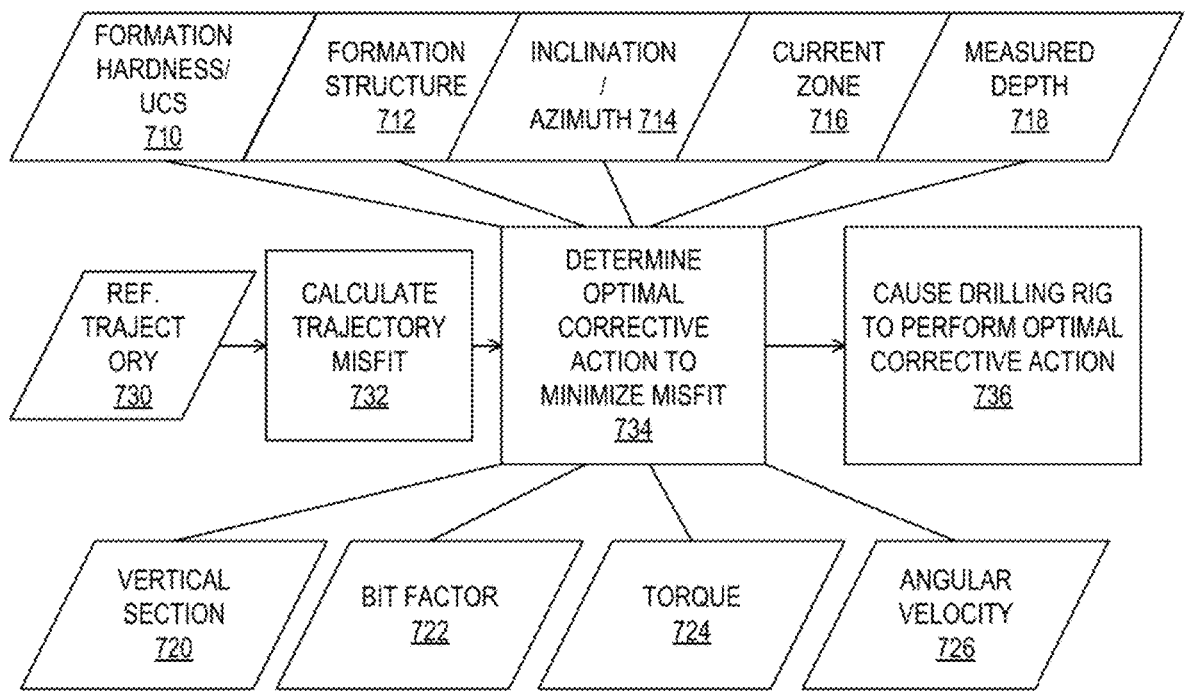
FIG. 6 is a depiction of algorithm modules used by the rig control systems.
FIG. 7 is a depiction of a steering control process used by the rig control systems.

FIG. 6 illustrates one embodiment of control algorithm modules 600 used with steering control system 168. The control algorithm modules 600 of FIG. 6 include: a slide control executor 650 that is responsible for managing the execution of the slide control algorithms; a slide control configuration provider 652 that is responsible for validating, maintaining, and providing configuration parameters for the other software modules; a bottom hole assembly, BHA & pipe specification provider 654 that is responsible for managing and providing details of bottom hole assembly, BHA 149 and drill string 146 characteristics; a borehole geometry model 656 that is responsible for keeping track of the borehole geometry and providing a representation to other software modules; a top drive orientation impact model 658 that is responsible for modeling the impact that changes to the angular orientation of top drive 140 have had on the tool face control; a top drive oscillator impact model 660 that is responsible for modeling the impact that oscillations of top drive 140 has had on the tool face control; a rate of penetration, ROP, impact model 662 that is responsible for modeling the effect on the tool face control of a change in rate of penetration, ROP, or a corresponding rate of penetration, ROP, set point; a weight-on-bit, WOB, impact model 664 that is responsible for modeling the effect on the tool face control of a change in weight-on-bit, WOB, or a corresponding weight-on-bit, WOB, set point; a differential pressure impact model 666 that is responsible for modeling the effect on the tool face control of a change in differential pressure or a corresponding differential pressure, DP, set point; a torque model 668 that is responsible for modeling the comprehensive representation of torque for surface, downhole, break over, and reactive torque, modeling impact of those torque values on tool face control, and determining torque operational thresholds; a tool face control evaluator 672 that is responsible for evaluating factors impacting tool face control and whether adjustments need to be projected, determining whether re-alignment off-bottom is indicated, and determining off-bottom tool face operational threshold windows; a tool face projection 670 that is responsible for projecting tool face behavior for top drive 140, the top drive oscillator, and auto driller adjustments; a top drive adjustment calculator 674 that is responsible for calculating top drive adjustments resultant to tool face projections; an oscillator adjustment calculator 676 that is responsible for calculating oscillator adjustments resultant to tool face projections; and an autodriller adjustment calculator 678 that is responsible for calculating adjustments to autodriller 510 resultant to tool face projections.

FIG. 7 illustrates one embodiment of a steering control process 700 for determining a corrective action for drilling. Steering control process 700 may be used for rotary drilling or slide drilling in different embodiments.

Steering control process 700 in FIG. 7 illustrates a variety of inputs that can be used to determine an optimum corrective action. As shown in FIG. 7, the inputs include formation hardness/unconfined compressive strength (UCS) 710, formation structure 712, inclination/azimuth 714, current zone 716, measured depth 718, desired tool face 730, vertical section 720, bit factor 722, mud motor torque 724, reference trajectory 730, vertical section 720, bit factor 722, torque 724 and angular velocity 726. In FIG. 7, reference trajectory 730 of borehole 106 is determined to calculate a trajectory misfit in a step 732. Step 732 may output the trajectory misfit to determine a corrective action to minimize the misfit at step 734, which may be performed using the other inputs described above. Then, at step 736, the drilling rig is caused to perform the corrective action.

It is noted that in some implementations, at least certain portions of steering control process 700 may be automated or performed without user intervention, such as using rig control systems 700 (see FIG. 7). In other implementations, the corrective action in step 736 may be provided or communicated (by display, SMS message, email, or otherwise) to one or more human operators, who may then take appropriate action. The human operators may be members of a rig crew, which may be located at or near drilling rig 210, or may be located remotely from drilling rig 210.

Figure 8:
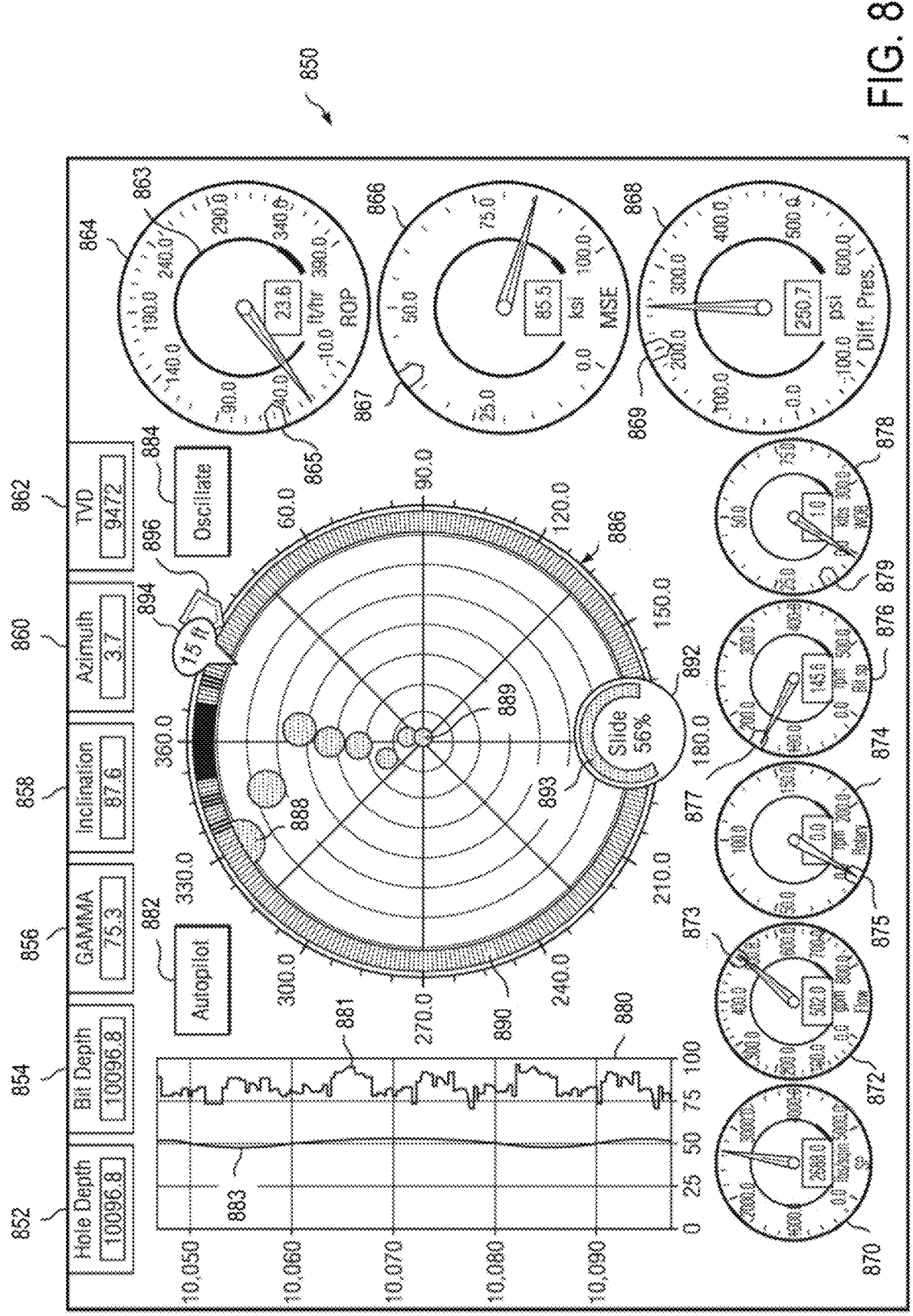
FIG. 8 is a depiction of a graphical user interface provided by the rig control systems.

Referring to FIG. 8, one embodiment of a user interface 850 that may be generated by steering control system 168 for monitoring and operation by a human operator is illustrated. User interface 850 may provide many different types of information in an easily accessible format. For example, user interface 850 may be shown on a computer monitor, a television, a viewing screen (e.g., a display device) associated with steering control system 168.

As shown in FIG. 8, user interface 850 provides visual indicators such as a hole depth indicator 852, a bit depth indicator 854, a GAMMA indicator 856, an inclination indicator 858, an azimuth indicator 860, and a true vertical depth, TVD, indicator 862. Other indicators may also be provided, including a rate of penetration, ROP, indicator 864, a mechanical specific energy, MSE, indicator 866, a differential pressure indicator 868, a standpipe pressure indicator 870, a flow rate indicator 872, a rotary rotations per minute, RPM (angular velocity) indicator 874, a bit speed indicator 876, and a weight-on-bit, WOB, indicator 878.

In FIG. 8, at least some of indicators 864, 866, 868, 870, 872, 874, 876, and 878 may include a marker representing a target value. For example, markers may be set as certain given values, but it is noted that any desired target value may be used. Although not shown, in some embodiments, multiple markers may be present on a single indicator. The markers may vary in color or size. For example, rate of penetration, ROP, indicator 864 may include a marker 865 indicating that the target value is 50 feet/hour (or 15 m/h). Mechanical specific energy, MSE indicator 866 may include a marker 867 indicating that the target value is 37 ksi (or 255 MPa). Differential pressure indicator 868 may include a marker 869 indicating that the target value is 200 psi (or 1.38 kPa). Rate of penetration, ROP, indicator 864 may include a marker 865 indicating that the target value is 50 feet/hour (or 15 m/h). Standpipe pressure indicator 870 may have no marker in the present example. Flow rate indicator 872 may include a marker 873 indicating that the target value is 500 gpm (or 31.5 L/s). Rotary rotations per minute, RPM, indicator 874 may include a marker 875 indicating that the target value is 0 rotations per minute, RPM, (e.g., due to sliding). Bit speed indicator 876 may include a marker 877 indicating that the target value is 150 rotations per minute, RPM. Weight-on-bit, WOB, indicator 878 may include a marker 879 indicating that the target value is 10 klbs (or 4,500 kg). Each indicator may also include a colored band, or another marking, to indicate, for example, whether the respective gauge value is within a safe range (e.g., indicated by a green color), within a caution range (e.g., indicated by a yellow color), or within a danger range (e.g., indicated by a red color).

In FIG. 8, a log chart 880 may visually indicate depth versus one or more measurements (e.g., may represent log inputs relative to a progressing depth chart). For example, log chart 880 may have a Y-axis representing depth and an X-axis representing a measurement such as GAMMA count 881 (as shown), rate of penetration, ROP 883 (e.g., empirical rate of penetration, ROP, and normalized rate of penetration, ROP), or resistivity. An autopilot button 882 and an oscillate button 884 may be used to control activity. For example, autopilot button 882 may be used to engage or disengage autodriller 510, while oscillate button 884 may be used to directly control oscillation of drill string 146 or to engage/disengage an external hardware device or controller.

In FIG. 8, a circular chart 886 may provide current and historical tool face orientation information (e.g., which way the bend is pointed). For purposes of illustration, circular chart 886 represents three hundred and sixty degrees. A series of circles within circular chart 886 may represent a timeline of tool face orientations, with the sizes of the circles indicating the temporal position of each circle. For example, larger circles may be more recent than smaller circles, so a largest circle 888 may be the newest reading and a smallest circle 889 may be the oldest reading. In other embodiments, circles 889, 888 may represent the energy or progress made via size, color, shape, a number within a circle, etc. For example, a size of a particular circle may represent an accumulation of orientation and progress for the period of time represented by the circle. In other embodiments, concentric circles representing time (e.g., with the outside of circular chart 886 being the most recent time and the center point being the oldest time) may be used to indicate the energy or progress (e.g., via color or patterning such as dashes or dots rather than a solid line).

In user interface 850, circular chart 886 may also be color coded, with the color coding existing in a band 890 around circular chart 886 or positioned or represented in other ways. The color coding may use colors to indicate activity in a certain direction. For example, the color red may indicate the highest level of activity, while the color blue may indicate the lowest level of activity. Furthermore, the arc range in degrees of a color may indicate the amount of deviation. Accordingly, a relatively narrow (e.g., thirty degrees) arc of red with a relatively broad (e.g., three hundred degrees) arc of blue may indicate that most activity is occurring in a particular tool face orientation with little deviation. As shown in user interface 850, the color blue may extend from approximately 22-337 degrees, the color green may extend from approximately 15-22 degrees and 337-345 degrees, the color yellow may extend a few degrees around the 13 and 345 degree marks, while the color red may extend from approximately 347-10 degrees. Transition colors or shades may be used with, for example, the color orange marking the transition between red and yellow or a light blue marking the transition between blue and green. This color coding may enable user interface 850 to provide an intuitive summary of how narrow the standard deviation is and how much of the energy intensity is being expended in the proper direction. Furthermore, the center of energy may be viewed relative to the target. For example, user interface 850 may clearly show that the target is at 90 degrees but the center of energy is at 45 degrees.

In user interface 850, other indicators, such as a slide indicator 892, may indicate how much time remains until a slide occurs or how much time remains for a current slide. For example, slide indicator 892 may represent a time, a percentage (e.g., as shown, a current slide may be 56% complete), a distance completed, or a distance remaining. Slide indicator 892 may graphically display information using, for example, a colored bar 893 that increases or decreases with slide progress. In some embodiments, slide indicator 892 may be built into circular chart 886 (e.g., around the outer edge with an increasing/decreasing band), while in other embodiments slide indicator 892 may be a separate indicator such as a meter, a bar, a gauge, or another indicator type. In various implementations, slide indicator 892 may be refreshed by autoslide 514.

In user interface 850, an error indicator 894 may indicate a magnitude and a direction of error. For example, error indicator 894 may indicate that an estimated drill bit position is a certain distance from the planned trajectory, with a location of error indicator 894 around the circular chart 886 representing the heading. For example, FIG. 8 illustrates an error magnitude of 15 feet and an error direction of 15 degrees. Error indicator 894 may be any color but may be red for purposes of example. It is noted that error indicator 894 may present a zero if there is no error. Error indicator may represent that drill bit 148 is on the planned trajectory using other means, such as being a green color. Transition colors, such as yellow, may be used to indicate varying amounts of error. In some embodiments, error indicator 894 may not appear unless there is an error in magnitude or direction. A marker 896 may indicate an ideal slide direction. Although not shown, other indicators may be present, such as a bit life indicator to indicate an estimated lifetime for the current bit based on a value such as time or distance.

It is noted that user interface 850 may be arranged in many different ways. For example, colors may be used to indicate normal operation, warnings, and problems. In such cases, the numerical indicators may display numbers in one color (e.g., green) for normal operation, may use another color (e.g., yellow) for warnings, and may use yet another color (e.g., red) when a serious problem occurs. The indicators may also flash or otherwise indicate an alert. The gauge indicators may include colors (e.g., green, yellow, and red) to indicate operational conditions and may also indicate the target value (e.g., a rate of penetration, ROP, of 100 feet/hour). For example, rate of penetration, ROP, indicator 868 may have a green bar to indicate a normal level of operation (e.g., from 10-300 feet/hour), a yellow bar to indicate a warning level of operation (e.g., from 300-360 feet/hour), and a red bar to indicate a dangerous or otherwise out of parameter level of operation (e.g., from 360-390 feet/hour). Rate of penetration, ROP indicator 868 may also display a marker at 100 feet/hour to indicate the desired target rate of penetration, ROP.

Furthermore, the use of numeric indicators, gauges, and similar visual display indicators may be varied based on factors such as the information to be conveyed and the personal preference of the viewer. Accordingly, user interface 850 may provide a customizable view of various drilling processes and information for a particular individual involved in the drilling process. For example, steering control system 168 may enable a user to customize the user interface 850 as desired, although certain features (e.g., standpipe pressure) may be locked to prevent a user from intentionally or accidentally removing important drilling information from user interface 850. Other features and attributes of user interface 850 may be set by user preference. Accordingly, the level of customization and the information shown by the user interface 850 may be controlled based on who is viewing user interface 850 and their role in the drilling process.

Figure 9:
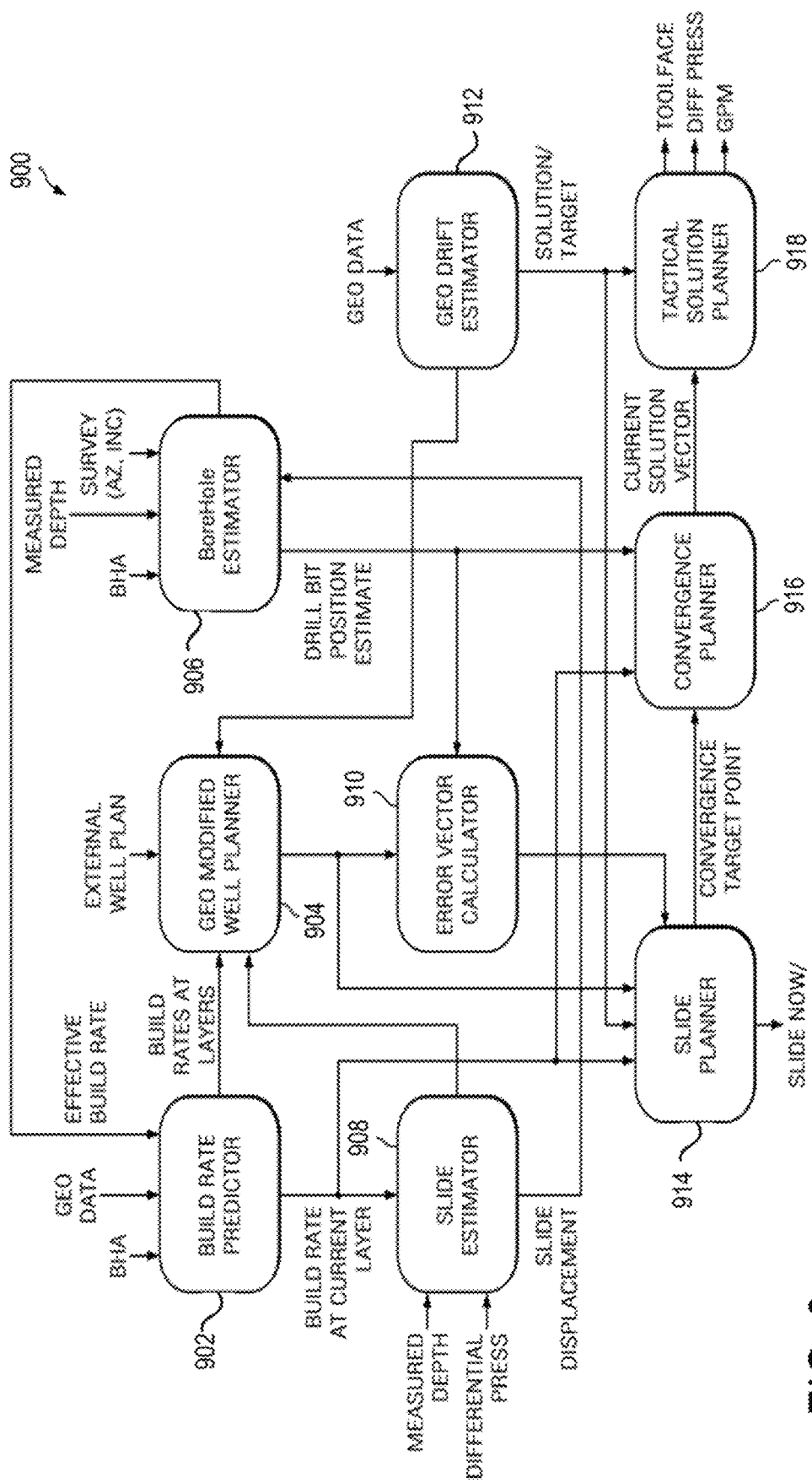
FIG. 9 is a depiction of a guidance control loop performed by the rig control systems.

Referring to FIG. 9, one embodiment of a guidance control loop, GCL, 900 is shown in further detail. Guidance control loop, GCL 900 may represent one example of a control loop or control algorithm executed under the control of steering control system 168. Guidance control loop, GCL 900 may include various functional modules, including a build rate predictor 902, a geo modified well planner 904, a borehole estimator 906, a slide estimator 908, an error vector calculator 910, a geological drift estimator 912, a slide planner 914, a convergence planner 916, and a tactical solution planner 918. In the following description of guidance control loop, GCL 900, the term "external input" refers to input received from outside guidance control loop, GCL 900, while "internal input" refers to input exchanged between functional modules of guidance control loop, GCL 900.

In FIG. 9, build rate predictor 902 receives external input representing bottom hole assembly, BHA, information and geological information, receives internal input from the borehole estimator 906, and provides output to geo modified well planner 904, slide estimator 908, slide planner 914, and convergence planner 916. Build rate predictor 902 is configured to use the bottom hole assembly, BHA, information and geological information to predict drilling build rates of current and future sections of borehole 106. For example, build rate predictor 902 may determine how aggressively a curve will be built for a given formation with bottom hole assembly, BHA 149 and other equipment parameters.

In FIG. 9, build rate predictor 902 may use the orientation of bottom hole assembly, BHA 149 to the formation to determine an angle of attack for formation transitions and build rates within a single layer of a formation. For example, if a strata layer of rock is below a strata layer of sand, a formation transition exists between the strata layer of sand and the strata layer of rock. Approaching the strata layer of rock at a 90 degree angle may provide a good tool face and a clean drill entry, while approaching the rock layer at a 45 degree angle may build a curve relatively quickly. An angle of approach that is near parallel may cause drill bit 148 to skip off the upper surface of the strata layer of rock. Accordingly, build rate predictor 902 may calculate bottom hole assembly, BHA, orientation to account for formation transitions. Within a single strata layer, build rate predictor 902 may use the bottom hole assembly, BHA, orientation to account for internal layer characteristics (e.g., grain) to determine build rates for different parts of a strata layer. The bottom hole assembly, BHA, information may include bit characteristics, mud motor bend setting, stabilization and mud motor bit to bend distance. The geological information may include formation data such as compressive strength, thicknesses, and depths for formations encountered in the specific drilling location. Such information may enable a calculation-based prediction of the build rates and rate of penetration, ROP, that may be compared to both results obtained while drilling borehole 106 and regional historical results (e.g., from the regional drilling database, DB 412) to improve the accuracy of predictions as drilling progresses. Build rate predictor 902 may also be used to plan convergence adjustments and confirm in advance of drilling that targets can be achieved with current parameters.

In FIG. 9, geo modified well planner 904 receives external input representing a well plan, internal input from build rate predictor 902 and geo drift estimator 912, and provides output to slide planner 914 and error vector calculator 910. Geo modified well planner 904 uses the input to determine whether there is a more desirable trajectory than that provided by the well plan, while staying within specified error limits. More specifically, geo modified well planner 904 takes geological information (e.g., drift) and calculates whether another trajectory solution to the target may be more efficient in terms of cost or reliability. The outputs of geo modified well planner 904 to slide planner 914 and error vector calculator 910 may be used to calculate an error vector based on the current vector to the newly calculated trajectory and to modify slide predictions. In some embodiments, geo modified well planner 904 (or another module) may provide functionality needed to track a formation trend. For example, in horizontal wells, a geologist may provide steering control system 168 with a target inclination as a set point for steering control system 168 to control. For example, the geologist may enter a target to steering control system 168 of 90.5-91.0 degrees of inclination for a section of borehole 106. Geo modified well planner 904 may then treat the target as a vector target, while remaining within the error limits of the original well plan. In some embodiments, geo modified well planner 904 may be an optional module that is not used unless the well plan is to be modified. For example, if the well plan is marked in steering control system 168 as non-modifiable, geo modified well planner 904 may be bypassed altogether or geo modified well planner 904 may be configured to pass the well plan through without any changes.

In FIG. 9, borehole estimator 906 may receive external inputs representing bottom hole assembly, BHA, information, measured depth information, survey information (e.g., azimuth and inclination), and may provide outputs to build rate predictor 902, error vector calculator 910, and convergence planner 916. Borehole estimator 906 may be configured to provide an estimate of the actual borehole and drill bit position and trajectory angle without delay, based on either straight line projections or projections that incorporate sliding. Borehole estimator 906 may be used to compensate for a sensor being physically located some distance behind drill bit 148 (e.g., 50 feet) in drill string 146, which makes sensor readings lag the actual bit location by 50 feet. Borehole estimator 906 may also be used to compensate for sensor measurements that may not be continuous (e.g., a sensor measurement may occur every 100 feet). Borehole estimator 906 may provide the most accurate estimate from the surface to the last survey location based on the collection of survey measurements. Also, borehole estimator 906 may take the slide estimate from slide estimator 908 (described below) and extend the slide estimate from the last survey point to a current location of drill bit 148. Using the combination of these two estimates, borehole estimator 906 may provide steering control system 168 with an estimate of the drill bit's location and trajectory angle from which guidance and steering solutions can be derived. An additional metric that can be derived from the borehole estimate is the effective build rate that is achieved throughout the drilling process.

In FIG. 9, slide estimator 908 receives external inputs representing measured depth and differential pressure information, receives internal input from build rate predictor 902, and provides output to borehole estimator 906 and geo modified well planner 904. Slide estimator 908 may be configured to sample tool face orientation, differential pressure, measured depth, MD, incremental movement, mechanical specific energy, MSE, and other sensor feedback to quantify/estimate a deviation vector and progress while sliding.

Traditionally, deviation from the slide would be predicted by a human operator based on experience. The operator would, for example, use a long slide cycle to assess what likely was accomplished during the last slide. However, the results are generally not confirmed until the downhole survey sensor point passes the slide portion of the borehole, often resulting in a response lag defined by a distance of the sensor point from the drill bit tip (e.g., approximately 50 feet). Such a response lag may introduce inefficiencies in the slide cycles due to over/under correction of the actual trajectory relative to the planned trajectory.

In guidance control loop, GCL 900, using slide estimator 908, each tool face update may be algorithmically merged with the average differential pressure of the period between the previous and current tool face readings, as well as the measured depth, MD change during this period to predict the direction, angular deviation, and measured depth, MD progress during the period. As an example, the periodic rate may be between 10 and 60 seconds per cycle depending on the tool face update rate of downhole tool 166. With a more accurate estimation of the slide effectiveness, the sliding efficiency can be improved. The output of slide estimator 908 may accordingly be periodically provided to borehole estimator 906 for accumulation of well deviation information, as well to geo modified well planner 904. Some or all of the output of the slide estimator 908 may be output to an operator, such as shown in the user interface 850 of FIG. 8.

In FIG. 9, error vector calculator 910 may receive internal input from geo modified well planner 904 and borehole estimator 906. Error vector calculator 910 may be configured to compare the planned well trajectory to an actual borehole trajectory and drill bit position estimate. Error vector calculator 910 may provide the metrics used to determine the error (e.g., how far off) the current drill bit position and trajectory are from the well plan. For example, error vector calculator 910 may calculate the error between the current bit position and trajectory to the planned trajectory and the desired bit position. Error vector calculator 910 may also calculate a projected bit position/projected trajectory representing the future result of a current error.

In FIG. 9, geological drift estimator 912 receives external input representing geological information and provides outputs to geo modified well planner 904, slide planner 914, and tactical solution planner 918. During drilling, drift may occur as the particular characteristics of the formation affect the drilling direction. More specifically, there may be a trajectory bias that is contributed by the formation as a function of rate of penetration, ROP, and bottom hole assembly, BHA 149. Geological drift estimator 912 is configured to provide a drift estimate as a vector that can then be used to calculate drift compensation parameters that can be used to offset the drift in a control solution.

In FIG. 9, slide planner 914 receives internal input from build rate predictor 902, geo modified well planner 904, error vector calculator 910, and geological drift estimator 912, and provides output to convergence planner 916 as well as an estimated time to the next slide. Slide planner 914 may be configured to evaluate a slide/drill ahead cost calculation and plan for sliding activity, which may include factoring in bottom hole assembly, BHA, wear, expected build rates of current and expected formations, and the well plan trajectory. During drill ahead, slide planner 914 may attempt to forecast an estimated time of the next slide to aid with planning. For example, if additional lubricants (e.g., fluorinated beads) are indicated for the next slide, and pumping the lubricants into drill string 146 has a lead time of 30 minutes before the slide, the estimated time of the next slide may be calculated and then used to schedule when to start pumping the lubricants. Functionality for a loss circulation material, LCM, planner may be provided as part of slide planner 914 or elsewhere (e.g., as a stand-alone module or as part of another module described herein). The loss circulation material, LCM, planner functionality may be configured to determine whether additives should be pumped into the borehole based on indications such as flow-in versus flow-back measurements. For example, if drilling through a porous rock formation, fluid being pumped into the borehole may get lost in the rock formation. To address this issue, the loss circulation material, LCM, planner may control pumping loss circulation material, LCM, into the borehole to clog up the holes in the porous rock surrounding the borehole to establish a more closed-loop control system for the fluid.

In FIG. 9, slide planner 914 may also look at the current position relative to the next connection. A connection may happen every 90 to 100 feet (or some other distance or distance range based on the particulars of the drilling operation) and slide planner 914 may avoid planning a slide when close to a connection or when the slide would carry through the connection. For example, if the slide planner 914 is planning a 50 foot slide but only 20 feet remain until the next connection, slide planner 914 may calculate the slide starting after the next connection and make any changes to the slide parameters to accommodate waiting to slide until after the next connection. Such flexible implementation avoids inefficiencies that may be caused by starting the slide, stopping for the connection, and then having to reorient the tool face before finishing the slide. During slides, slide planner 914 may provide some feedback as to the progress of achieving the desired goal of the current slide. In some embodiments, slide planner 914 may account for reactive torque in the drill string. More specifically, when rotating is occurring, there is a reactional torque wind up in drill string 146. When the rotating is stopped, drill string 146 unwinds, which changes tool face orientation and other parameters. When rotating is started again, drill string 146 starts to wind back up. Slide planner 914 may account for the reactional torque so that tool face references are maintained, rather than stopping rotation and then trying to adjust to a desired tool face orientation. While not all downhole tools may provide tool face orientation when rotating, using one that does supply such information for guidance control loop, GCL 900 may significantly reduce the transition time from rotating to sliding.

In FIG. 9, convergence planner 916 receives internal inputs from build rate predictor 902, borehole estimator 906, and slide planner 914, and provides output to tactical solution planner 918. Convergence planner 916 is configured to provide a convergence plan when the current drill bit position is not within a defined margin of error of the planned well trajectory. The convergence plan represents a path from the current drill bit position to an achievable and desired convergence target point along the planned trajectory. The convergence plan may take account the amount of sliding/drilling ahead that has been planned to take place by slide planner 914. Convergence planner 916 may also use bottom hole assembly, BHA, orientation information for angle of attack calculations when determining convergence plans as described above with respect to build rate predictor 902. The solution provided by convergence planner 916 defines a new trajectory solution for the current position of drill bit 148. The solution may be immediate without delay, or planned for implementation at a future time that is specified in advance.

In FIG. 9, tactical solution planner 918 receives internal inputs from geological drift estimator 912 and convergence planner 916, and provides external outputs representing information such as tool face orientation, differential pressure, and mud flow rate. Tactical solution planner 918 is configured to take the trajectory solution provided by convergence planner 916 and translate the solution into control parameters that can be used to control drilling rig 210. For example, tactical solution planner 918 may convert the solution into settings for control systems 522, 524, and 526 to accomplish the actual drilling based on the solution. Tactical solution planner 918 may also perform performance optimization to optimizing the overall drilling operation as well as optimizing the drilling itself (e.g., how to drill faster).

Other functionality may be provided by guidance control loop, GCL 900 in additional modules or added to an existing module. For example, there is a relationship between the rotational position of the drill pipe on the surface and the orientation of the downhole tool face. Accordingly, guidance control loop, GCL 900 may receive information corresponding to the rotational position of the drill pipe on the surface. Guidance control loop, GCL 900 may use this surface positional information to calculate current and desired tool face orientations. These calculations may then be used to define control parameters for adjusting the top drive 140 to accomplish adjustments to the downhole tool face in order to steer the trajectory of borehole 106.

For purposes of example, an object-oriented software approach may be utilized to provide a class-based structure that may be used with guidance control loop, GCL 900 or other functionality provided by steering control system 168. In guidance control loop, GCL 900, a drilling model class may be defined to capture and define the drilling state throughout the drilling process. The drilling model class may include information obtained without delay. The drilling model class may be based on the following components and sub-models: a drill bit model, a borehole model, a rig surface gear model, a mud pump model, a weight-on-bit, WOB/differential pressure model, a positional/rotary model, a mechanical specific energy, MSE, model, an active well plan, and control limits. The drilling model class may produce a control output solution and may be executed via a main processing loop that rotates through the various modules of guidance control loop, GCL 900. The drill bit model may represent the current position and state of drill bit 148. The drill bit model may include a three dimensional, 3D, position, a drill bit trajectory, bottom hole assembly, BHA, information, bit speed, and tool face (e.g., orientation information). The 3D position may be specified in north-south, NS, east-west, EW and true vertical depth, TVD The drill bit trajectory may be specified as an inclination angle and an azimuth angle. The bottom hole assembly, BHA, information may be a set of dimensions defining the active bottom hole assembly, BHA. The borehole model may represent the current path and size of the active borehole. The borehole model may include hole depth information, an array of survey points collected along the borehole path, a gamma log, and borehole diameters. The hole depth information is for current drilling of borehole 106. The borehole diameters may represent the diameters of borehole 106 as drilled over current drilling. The rig surface gear model may represent pipe length, block height, and other models, such as the mud pump model, weight-on-bit, WOB/differential pressure model, positional/rotary model, and mechanical specific energy, MSE model. The mud pump model represents mud pump equipment and includes flow rate, standpipe pressure, and differential pressure. The weight-on-bit, WOB/differential pressure model represents draw works or other weight-on-bit, WOB/differential pressure controls and parameters, including weight-on-bit, WOB. The positional/rotary model represents top drive or other positional/rotary controls and parameters including rotary rotations per minute, RPM, and spindle position. The active well plan represents the target borehole path and may include an external well plan and a modified well plan. The control limits represent defined parameters that may be set as maximums and/or minimums. For example, control limits may be set for the rotary rotations per minute, RPM, in the top drive model to limit the maximum rotations per minute, RPMs, to the defined level. The control output solution may represent the control parameters for drilling rig 210.

Each functional module of guidance control loop, GCL 900 may have behavior encapsulated within a respective class definition. During a processing window, the individual functional modules may have an exclusive portion in time to execute and update the drilling model. For purposes of example, the processing order for the functional modules may be in the sequence of geo modified well planner 904, build rate predictor 902, slide estimator 908, borehole estimator 906, error vector calculator 910, slide planner 914, convergence planner 916, geological drift estimator 912, and tactical solution planner 918. It is noted that other sequences may be used in different implementations.

In FIG. 9, guidance control loop, GCL 900 may rely on a programmable timer module that provides a timing mechanism to provide timer event signals to drive the main processing loop. While steering control system 168 may rely on timer and date calls driven by the programming environment, timing may be obtained from other sources than system time. In situations where it may be advantageous to manipulate the clock (e.g., for evaluation and testing), a programmable timer module may be used to alter the system time. For example, the programmable timer module may enable a default time set to the system time and a time scale of 1.0, may enable the system time of steering control system 168 to be manually set, may enable the time scale relative to the system time to be modified, or may enable periodic event time requests scaled to a requested time scale.

Referring now to FIG. 10, a block diagram illustrating selected elements of an embodiment of a controller 1000 for performing surface steering according to the present disclosure. In various embodiments, controller 1000 may represent an implementation of steering control system 168. In other embodiments, at least certain portions of controller 1000 may be used for control systems 510, 512, 514, 522, 524, and 526 (see FIG. 5).

In the embodiment depicted in FIG. 10, controller 1000 includes processor 1001 coupled via shared bus 1002 to storage media collectively identified as memory media 1010.

Controller 1000, as depicted in FIG. 10, further includes network adapter 1020 that interfaces controller 1000 to a network (not shown in FIG. 10). In embodiments suitable for use with user interfaces, controller 1000, as depicted in FIG. 10, may include peripheral adapter 1006, which provides connectivity for the use of input device 1008 and output device 1009. Input device 1008 may represent a device for user input, such as a keyboard or a mouse, or even a video camera. Output device 1009 may represent a device for providing signals or indications to a user, such as loudspeakers for generating audio signals.

Controller 1000 is shown in FIG. 10 including display adapter 1004 and further includes a display device 1005. Display adapter 1004 may interface shared bus 1002, or another bus, with an output port for one or more display devices, such as display device 1005. Display device 1005 may be implemented as a liquid crystal display screen, a computer monitor, a television or the like. Display device 1005 may comply with a display standard for the corresponding type of display. Standards for computer monitors include analog standards such as video graphics array, VGA extended graphics array, XGA etc., or digital standards such as digital visual interface, DVI high definition multimedia interface, HDMI mong others. A television display may comply with standards such as National Television System Committee, NTSC, Phase Alternating Line, PAL or another suitable standard. Display device 1005 may include an output device 1009, such as one or more integrated speakers to play audio content, or may include an input device 1008, such as a microphone or video camera.

In FIG. 10, memory media 1010 encompasses persistent and volatile media, fixed and removable media, and magnetic and semiconductor media. Memory media 1010 is operable to store instructions, data, or both. Memory media 1010 as shown includes sets or sequences of instructions 1024-2, namely, an operating system 1012 and surface steering control 1014. Operating system 1012 may be a UNIX or UNIX-like operating system, a Windows® family operating system, or another suitable operating system. Instructions 1024 may also reside, completely or at least partially, within processor 1001 during execution thereof. It is further noted that processor 1001 may be configured to receive instructions 1024-1 from instructions 1024-2 via shared bus 1002. In some embodiments, memory media 1010 is configured to store and provide executable instructions for executing guidance control loop, GCL 900, as mentioned previously, among other methods and operations disclosed herein.

In other embodiments, stratigraphic information may also be used to steer a wellbore. Stratigraphic misfit heat map curves can be computed to display the misfit between the characteristic functions of the subject and offset wells. In particular, a likelihood and uncertainty of the wellbore being at a particular stratigraphic vertical depth may be derived according to the methods described below.

Stratigraphic information along a wellbore can directly be inferred from sensor data, such gamma ray, neutron density, electrical resistivity and acoustic velocity. On the other hand, stratigraphic information may also be inferred from drilling dynamics data, such as changes in the rate of penetration, torque, weight on bit, mean specific energy, vibrations, differential mud pressure, and combinations of the foregoing. Further ancillary information may be available from monitoring the composition of the drilling fluid returning from down hole. The following discusses the use of drilling dynamics data in more detail. Related background information can be found in U.S. Patent Application Ser. No.

62/820,191, filed on Mar. 18, 2019, and in in U.S. Patent Application Ser. No. 62/834,154, filed on Apr. 15, 2019, and which are both hereby incorporated by reference.

Drilling dynamics parameters carry information about rock properties. However, this geological information should be separated from noise and unrelated drilling events. Described below are systems and methods useful to compute the uncertainty of vertical depth inferred from stratigraphic heat map curves, to more accurately steer a wellbore into one or multiple geological targets.

It is to be noted that the systems and methods described below may be implemented with one or more computer systems, which may comprise steering control system 168 as described above, or other computer systems. The computer systems may have one or more databases with the appropriate information, such as well logs, previous well log correlations, and the like, and such logs may comprise logs from one or more previously drilled offset wells and/or from previously drilled portions of a well being drilled. Moreover, such computer systems may be coupled to one or more other systems at one or more remote locations from the well being drilled, allowing an operator remotely located to view and analyze the information and display(s) generated by the systems and methods of the present disclosure. Such computer systems also may be coupled to one or more control systems of the drilling rig and/or specific items of drilling equipment, such that the computer systems may send one or more control signals to such control systems to adjust or modify one or more drilling parameters, such as weight on bit, rate of penetration, revolutions per minute, torque, differential pressure, and so forth, as well as or alternatively one or more drilling operations, such as by adjusting the direction of the drilling by one or more slide drilling operations. Such computer systems may be programmed to make such adjustments and modifications automatically without operator input, or to provide an alert to an operator and await operator confirmation before commencing such an adjustment or modification. Stratigraphic Heat Map Curve and Stratigraphic Vertical Depth, SVD The terms 'heat map curve' and 'stratigraphic vertical depth', in preparation for the subsequent definition of depth uncertainty are clarified below.

In drilling the subject wellbore, measurements are collected at measured depths of the subject wellbore, $MD_{SWk}$ along the wellbore, ranging from a starting measured depth of the subject wellbore, $MD_{SW1}$, to a target measured depth of the subject wellbore, $MD_{SWL}$ (also referred to herein as the target measured depth for the subject wellbore, $TMD_{sw}$).

The misfit, M, quantifies a disagreement of the logging values (e.g., gamma log values) measured on the subject wellbore with the reference measurements. The reference measurements may originate from one or multiple offset wells, which may have been extrapolated to the location of the subject wellbore using a 3D geological model.

The following vertical depths can be defined:

True Vertical Depth of the Subject Wellbore, $TVD_{SW}$: True vertical depth, $TVD_{SW}$, represents true vertical depth of the subject wellbore in a geodetic reference coordinate system. True vertical depth of the subject wellbore, $TVD_{sw}$, is the depth in the geodetic space.

Stratigraphic Vertical Depth of the offset wellbore, $SVD_{OW}$ and the subject wellbore, $SVD_{SW}$: Stratigraphic vertical depth (e.g., of the offset wellbore, $SVD_{OW}$ or the subject wellbore, $SVD_{SW}$) represents vertical depth in a stratigraphic geomodel. For a perfectly accurate geomodel, the geomodel space would match the geodetic space and the stratigraphic vertical depth of the subject wellbore, $SVD_{SW}$, would be identical to the true vertical depth of the subject wellbore, $TVD_{SW}$. However, due to uncertainties in the exact location and depth of geological faults and horizons, the true vertical depth of the subject wellbore, $TVD_{SW}$, of a position in a wellbore may deviate from the stratigraphic vertical depth of the subject wellbore, $SVD_{SW}$, in real world applications. From a surveying perspective, true vertical depth of the subject wellbore, $TVD_{SW}$, is the depth inferred from the measurement while drilling, MWD, sensors while stratigraphic vertical depth of the offset wellbore, $SVD_{OW}$, is the depth inferred from correlating gamma log values with the reference typelog at the location of the wellbore.

Relative Stratigraphic Vertical Depth, RSVD: Relative stratigraphic vertical depth of the offset and subject wellbores may be obtained by subtracting the true vertical depth of the subject wellbore, $TVD_{SW}$, from the stratigraphic vertical depth of the offset wellbore, $SVD_{OW}$, as in RSVD=$SVD_{OW}$-$TVD_{SW}$. In terms of displaying a heat map curve, the Y axis may define the vertical displacement of the stratigraphy from the true vertical depth, $TVD_{SW}$, of the subject wellbore. For example, if relative stratigraphic vertical depth, RSVD, is positive, then the wellbore may be deeper in the reference geomodel space than in geodetic space ($SVD_{OW}$>$TVD_{SW}$).

The heat map curve displays color-coded misfits $M(MD_{SW}, SVD_{OW})$, where measured depth of the subject well, $MD_{SW}$ defines the X-axis, while stratigraphic vertical depth of the offset well, $SVD_{OW}$ defines the Y-axis.

As an alternative, a relative heat map curve displays color-coded misfits $M(MD_{SW}, RSVD)$ relative to the depth of the wellbore, where measured depth of the subject wellbore, $MD_{SW}$, defines the X-axis, while relative stratigraphic vertical depth, RSVD, defines the Y-axis.

A stratigraphic interpretation i, with the index i running from 1 to the number of interpretations N, is a path through the heat map curve given by (x, y) coordinates $(MD_{SWk}, SV_{DOWi}(MD_{SWk}))$ The total misfit of an interpretation i may be computed by adding up the misfits over measured depths of the subject wellbore, $MD_{SWk}$, ranging from starting measured depth of the subject wellbore, $MD_{SW1}$ up to the target measured depth of the subject wellbore, $TMD_{sw}$, i.e., $MD_{SWL}$ on the subject well. This gives $$M_i = \Sigma k(M(MD_{SWk}, SVD_{OWi}(MD_{SWk})))$$

The average misfit of the stratigraphic interpretation may be computed by dividing the total misfit by the number of points L.

The above concepts are illustrated respectively for vertical and horizontal wellbores in FIGS. 11-15.

Figure 11:
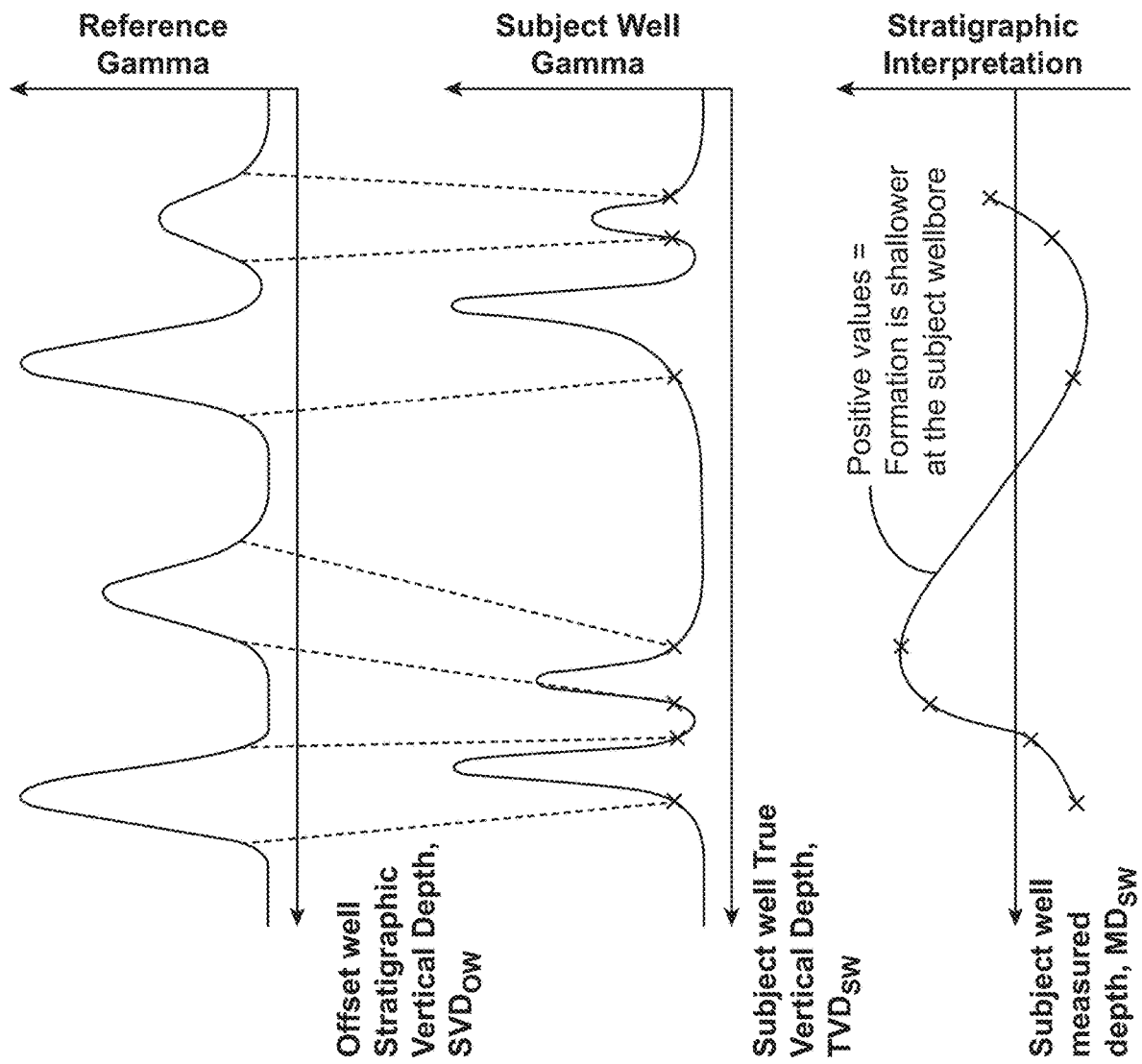
FIG. 11 is an example of a vertical wellbore stratigraphic interpretation.

FIG. 11 shows an example of vertical wellbore logs. At the left of FIG. 11 is an idealized reference gamma log curve from an offset well. In the middle of FIG. 11 is the idealized gamma log curve measured on the subject well. At the right of FIG. 11, a log of the stratigraphic vertical depth of the offset wellbore, $SVD_{ow}$, shows a stratigraphic interpretation (e.g., a spline function), which describes the displacement of the true vertical depth of the subject well, $TVD_{SW}$, relative to the reference gamma log curve (also referred to as a "typelog"). In FIG. 11, dashed lines show a correspondence between the reference gamma log curve and the subject well gamma log curve at particular points, which are indicated with a marker on the subject well gamma log curve. It is noted that the dashed lines may not be parallel along the depth axis, which indicates how the reference gamma log curve is correlated with the subject well gamma log curve in an exemplary interpretation. The particular mapping of the dashed lines shown in FIG. 11 may represent one so-called "interpretation" of stratigraphic vertical depth of the subject wellbore, $SVD_{sw}$, while other possible mappings resulting in different interpretations of stratigraphic vertical depth of the subject wellbore, $SVD_{sw}$, can also be generated. The methods described herein can generate different mappings and interpretations of stratigraphic vertical depth of the subject wellbore, $SVD_{sw}$, and can statistically compare them to one another using a quantitative metric, such as a likelihood that a particular interpretation 'matches' the subject wellbore to the offset wellbore for a given depth or a given range of depths. The term 'matches' may refer to a determination using a tolerance value, such that a match or a closest match is determined relative to difference between two compared values being within the tolerance value. For the purposes of stratigraphic analysis described herein, such a match within the tolerance value may indicate effective equivalence for operational purposes. In some instances, the tolerance value may be based, at least in part, on accuracy or precision of measurements and log data used for the stratigraphic analysis. In some embodiments, it may be useful to use different tolerances, such as defining a wider tolerance range for one section of a well and a narrower tolerance range for a second section of the wellbore, such as where greater accuracy or precision is more important for the second section than it is for the first section in this example. It is also to be noted that the tolerance or tolerances to be used may be varied during drilling of the well, such as by operator input, or may be programmed to automatically change due to well or drilling conditions, for different segments or the well, different drilling operations (e.g., slide versus rotary drilling), or responsive to different drilling parameters (e.g., rate of penetration, ROP, weight-on-bit, WOB, differential pressure, DP, etc.). It is further noted that markers on the stratigraphic interpretation may correspond to the location of the markers on the subject well gamma log curve.

Figure 12:
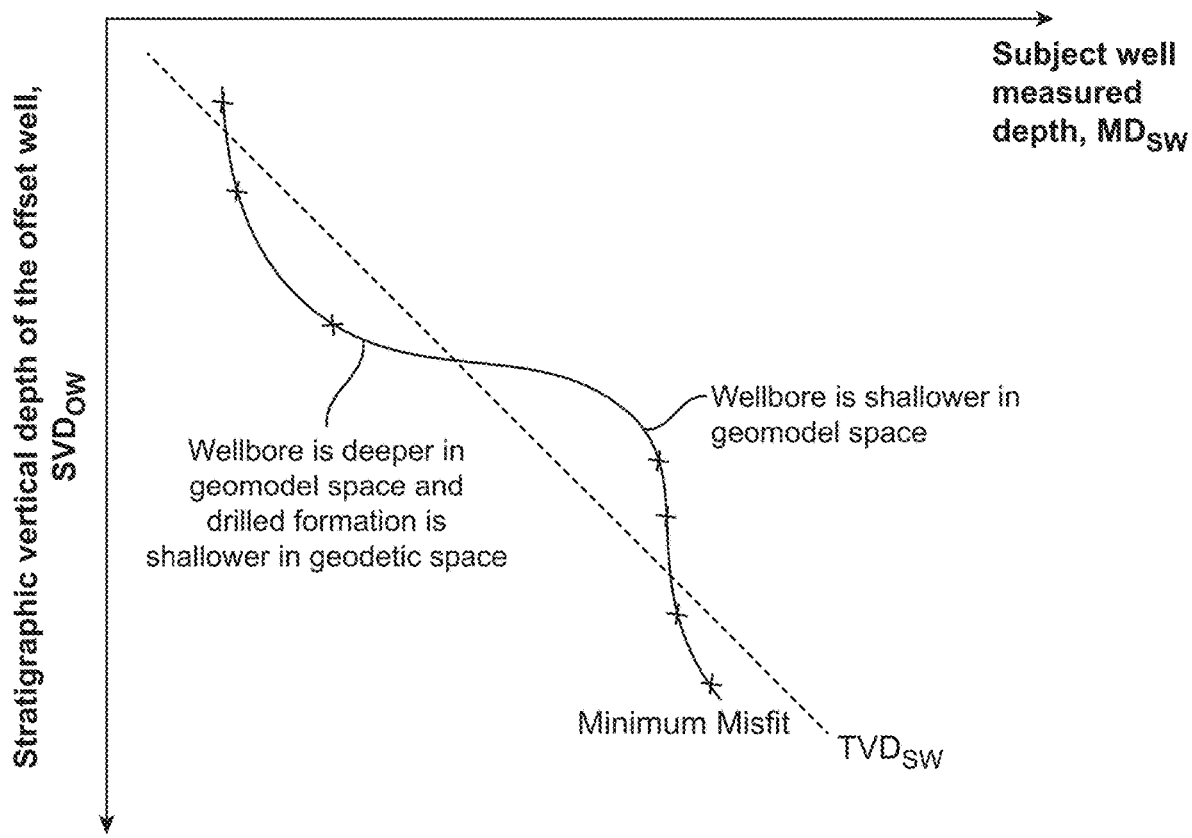
FIG. 12 is a vertical wellbore heat map curve displayed against stratigraphic vertical depth (SVD)
Figure 13:
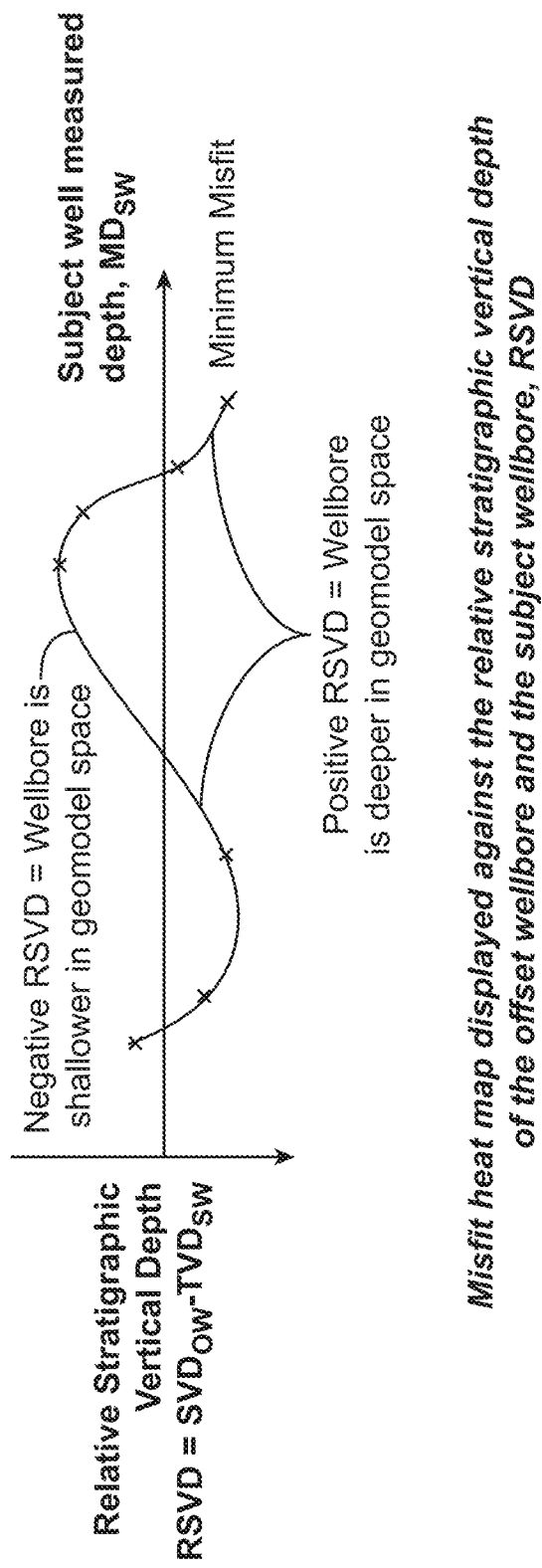
FIG. 13 is a misfit heat map curve displayed against the relative stratigraphic vertical depth, RSVD

Shown in FIGS. 12 and 13 are two options of displaying stratigraphic misfit heat map curves. In both FIGS. 12 and 13, the X-axis may be given by the measured depth, MD, along the wellbore. In the first option (FIG. 12), the Y axis is the stratigraphic vertical depth of the reference (or offset) well (or typelog), $SVD_{OW}$. In the case shown in FIG. 12, the formation markers appear as horizontal lines on the heat map curve. In the absence of a 3D geomodel, the geology is assumed to be flat and the markers may be horizontal lines. The subject wellbore is shown as a dashed line. For a vertical wellbore the subject well bore dashed line has a downward slope of 45° in the plot of FIG. 12. When the line of minimum misfit (solid line) in the heat map curve of FIG. 12 appears below the dashed line, the wellbore is deeper in the geomodel space (i.e., more of the typelog has been traversed with depth). Conversely, a deeper wellbore means that the formation is encountered in the wellbore at a shallower true vertical depth of the subject wellbore, $TVD_{SW}$, than the corresponding stratigraphic vertical depth of the offset well, $SVD_{OW}$, in the geomodel space. The detection of a deeper wellbore may lead to a decision to steer the wellbore upward. On the other hand, when the minimum misfit line (solid line) is situated above the dashed line, the wellbore is located shallower in stratigraphic vertical depth of the offset well, geospace SVDOW, than in true vertical depth of the subject wellbore, $TVD_{SW}$. The formation at the shallower stratigraphic vertical depth of the offset well, $SVD_{OW}$, in the geospace is then encountered at a deeper true vertical depth of the subject wellbore, $TVD_{SW}$, at the subject wellbore. A shallower wellbore may lead to the decision to steer downward to reach the desired target formation.

To avoid creating a large map in which most of the relevant information may be obscured by being located close to the diagonal line, the subject wellbore true vertical depth of the subject wellbore, $TVD_{SW}$, can be subtracted from the reference wellbore stratigraphic vertical depth, $SVD_{OW}$, to show only the region close to the diagonal dashed line. Such a plot is shown in FIG. 13 and may be referred to as a Relative Stratigraphic Vertical Depth, RSVD Instead of horizontal, the marker horizons on the heat map curve now appear with an upward slope of 45° for flat or level formation boundaries. Once the wellbore becomes horizontal, the markers also become horizontal in the projection of FIG. 13. It is noted that the markers and the heat map curves shown in FIGS. 12 and 13 may correspond to the stratigraphic interpretation depicted and described above with respect to FIG. 11.

Figure 14A:
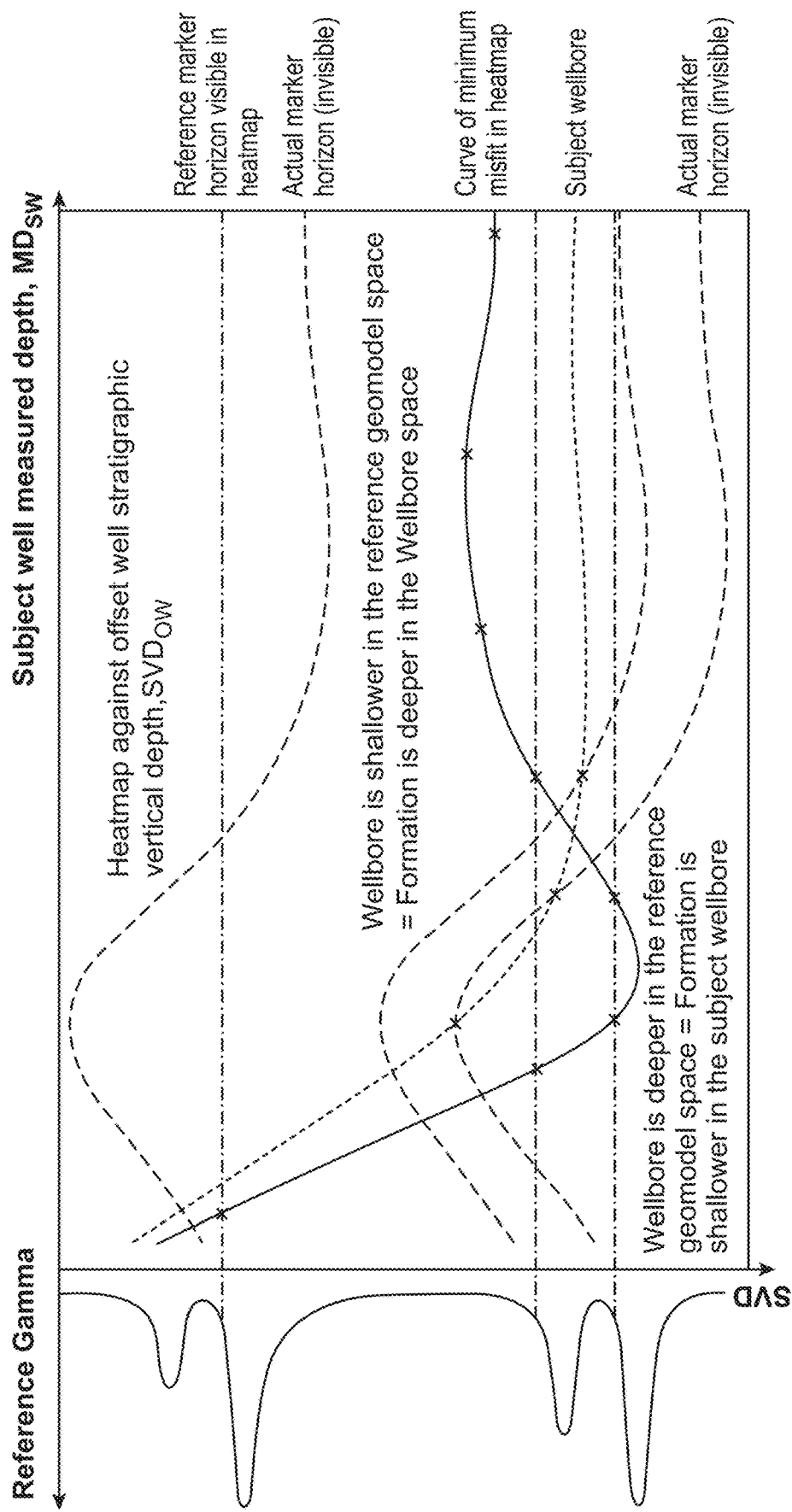
FIG. 14A and FIG. 14B illustrate a heat map curve interpretation for a horizontal wellbore with flat reference geomodel.
Figure 14B:
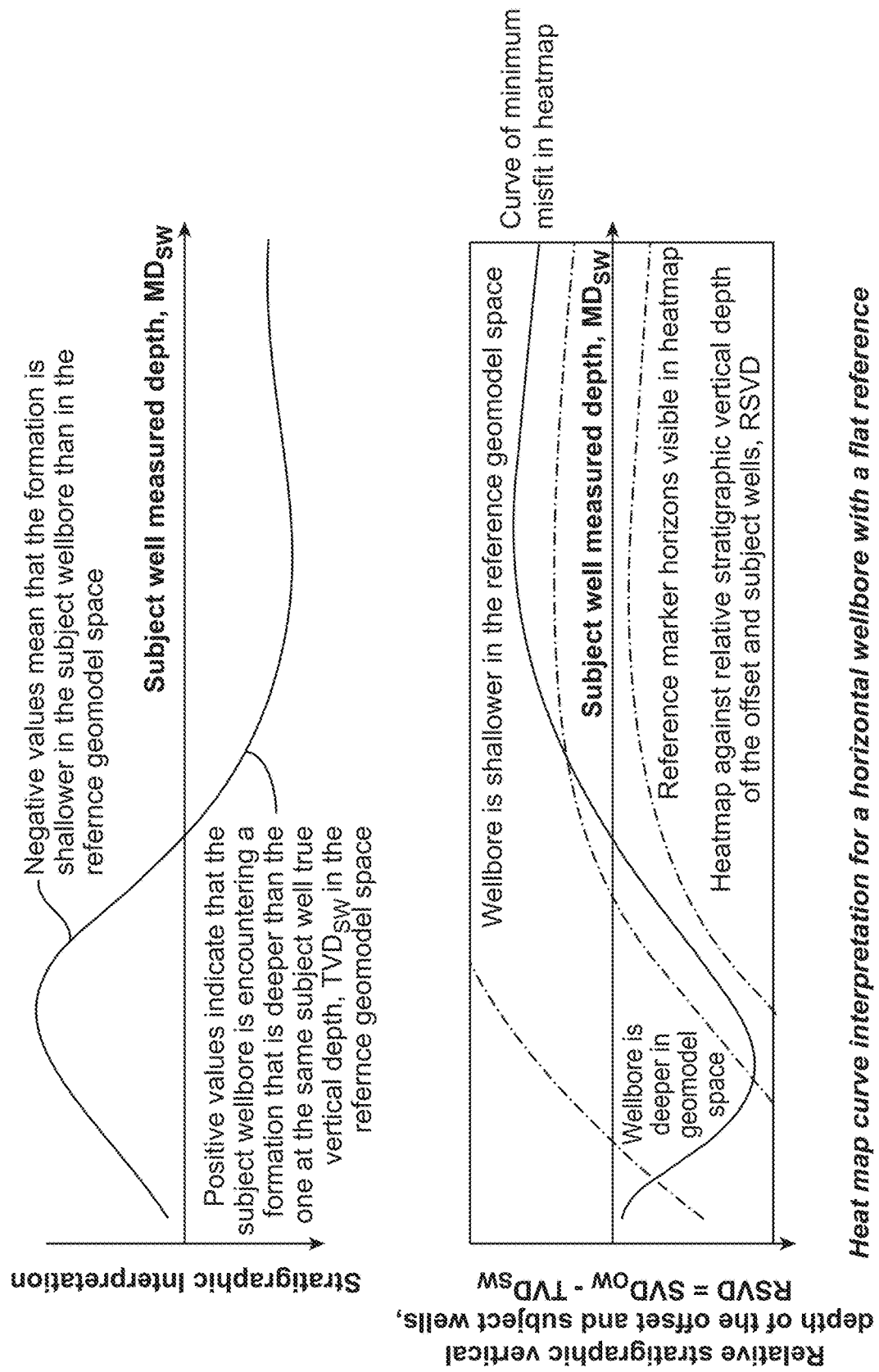

FIGS. 14A-14B show an example of a horizontal well without a pre-drill geomodel. In particular, FIGS. 14A-14B show a wellbore coming in through the curve and landing in the lateral section. It may be assumed that there is only a single reference offset well (e.g., typelog). The use of reference log data from a single reference offset well may be equivalent to using a flat geomodel reference space, in which the reference horizons do not change along the wellbore.

In FIGS. 14A-14B, the reference marker horizons are shown as dash-point lines. The reference marker horizons are visible in the heat map curve because they correspond to a strong change in the reference gamma log. The reference marker horizons visible in the heat map curve may not be the true locations of the horizons. FIGS. 14A-14B also show the true depths of the actual reference marker horizons as large-dashed lines, which may not be visible in the heat map curve. The true marker horizons may become detectable in the data when the subject wellbore crosses one of the true depths of the actual reference marker horizons.

In FIGS. 14A-14B, the solid line in the upper plot and in the lower plot shows the valley of minimum misfit in the heat map curve. In the example shown, the valley is below the subject wellbore in the left half of FIGS. 14A-14B and later crosses over to above the wellbore on the right-hand side of FIGS. 14A-14B. When the minimum misfit (solid line) is below the wellbore (small-dash line), the reference depth is greater than the true vertical depth of the subject wellbore, $TVD_{SW}$, which can mean that the geology encountered by the wellbore is deeper in the reference model. Conversely, the same geological formation may be shallower in the subject wellbore. A consequence of such detected variance could be that the well plan may be adjusted upward because the well has already been drilled into a formation deeper than anticipated from the reference. On the right side of FIGS. 14A-14B the situation is opposite: the wellbore is encountering geology which matches a shallower true vertical depth of the subject wellbore, $TVD_{SW}$, on the typelog, so a steer downward may be indicated to get into the target formation.

Figure 15A:
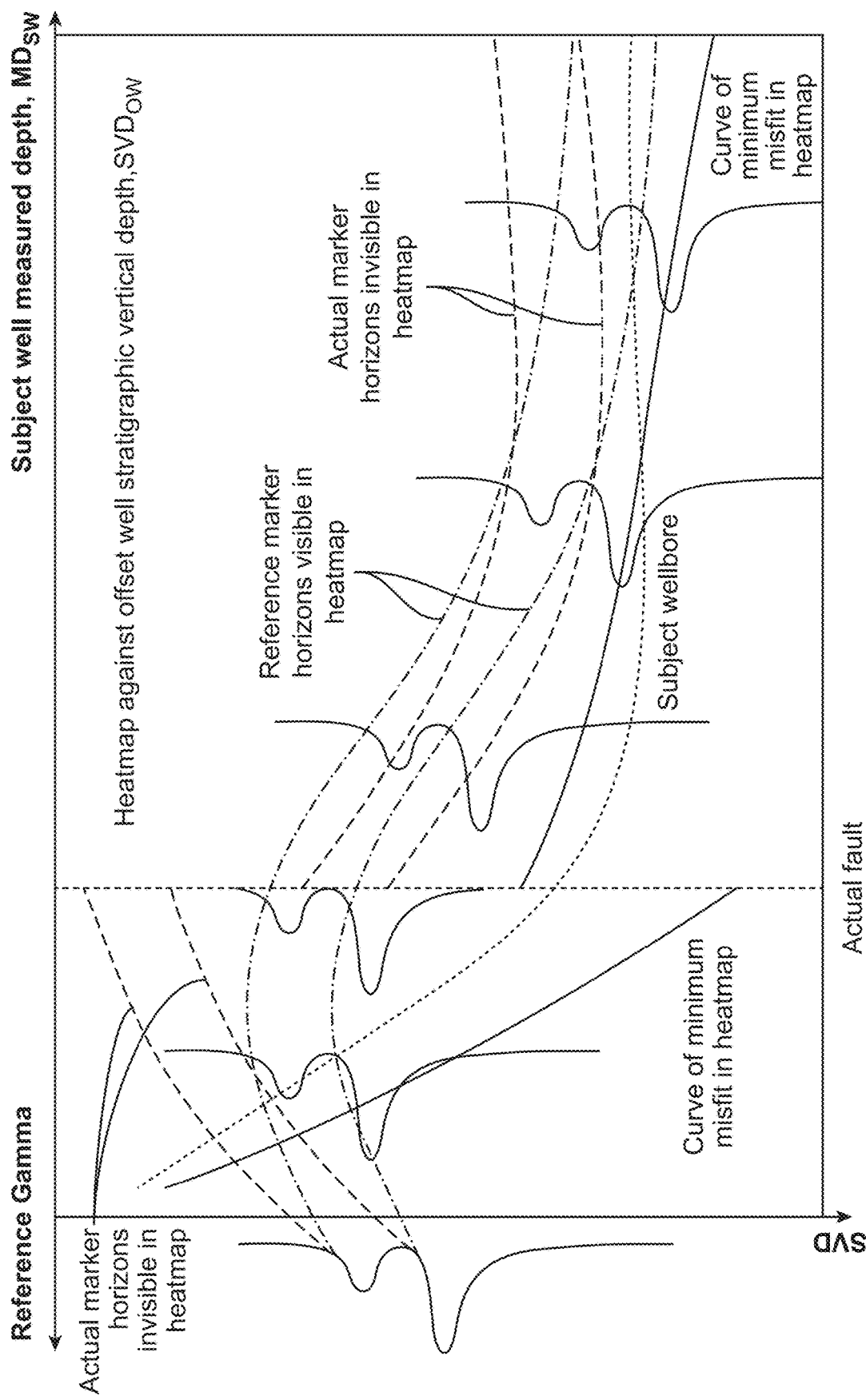
FIG. 15A and FIG. 15B illustrate a heat map curve interpretation for a horizontal wellbore with 3D reference geomodel.
Figure 15B:
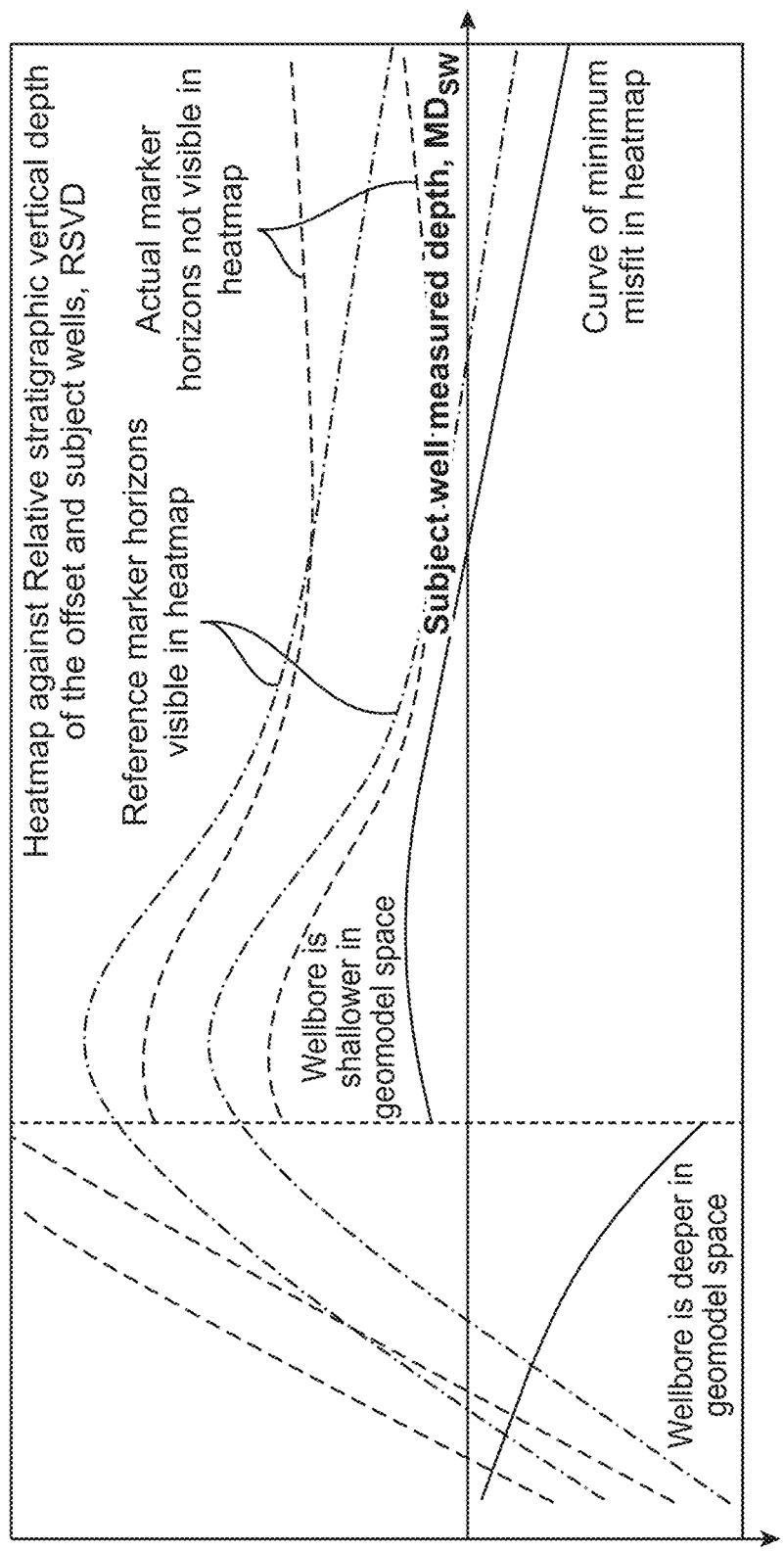

FIGS. 15A-15B show an example of a horizontal well using a pre-drill geomodel. FIGS. 15A-15B illustrate a situation in which a pre-drill 3D geomodel is available. Using the pre-drill 3D model, a vertical section can be created along the well plan through the geomodel. The reference typelog then changes with the measured depth along the wellbore. If the pre-drill geomodel were fully accurate and the wellbore position were surveyed accurately with the measurement while drilling, MWD, sensors, then the solid line of minimum misfit in the heat map curve would fall exactly on top of the small-dashed line of wellbore trajectory, because the wellbore gamma sensor would then measure exactly what was expected from the reference geomodel for that position and depth.

The example in FIGS. 15A-15B may show a more realistic situation in which the geomodel gives a reasonable approximation of the true geology, but the true marker horizons (large-dashed lines) depart from the reference horizons (dot-dashed lines). Also included in the example of FIGS. 15A-15B is an actual fault, shown as a vertical line of discontinuity, that is assumed to not have been known previously and was, therefore, not included in the pre-drill geomodel. In FIG. 15, to the left of the fault, the wellbore is deeper in the geomodel space, whereas at the fault it jumps to being shallower in the geomodel space.

FIG. 15B refers to the same situation, but the Y axis of the heat map curve instead shows Relative Stratigraphic Vertical Depth, RSVD, instead of stratigraphic vertical depth of the offset wellbore, $SVD_{OW}$.

Likelihood of being at a Particular Stratigraphic Depth

At any measured depth, MD, on the subject well, stratigraphic heat map curves can be used to infer a likelihood of the wellbore being at a particular stratigraphic depth. Furthermore, the probability-weighted stratigraphic depth, the most likely depth, and the uncertainty of depth can be determined by performing the following operations.

- Select a starting measured depth of the subject wellbore, $MD_{SW1}$, on the subject wellbore. The starting measured depth of the subject wellbore, $MD_{SW1}$, could be, for example, the wellhead, a uniquely identified crossing of a stratigraphic marker or crossing of a stratigraphic fault.
- Identify possible interpretations of sequences of stratigraphic depth along the wellbore, corresponding to valleys in the stratigraphic heat map curve.
- Order the interpretations by their stratigraphic vertical depth of the subject wellbore, $SVD_{SWi}(MDL)$, at the target measured depth for the subject wellbore, $TMD_{sw}$, i.e., MDL. Different interpretations can end up at approximately the same stratigraphic vertical depth of the subject wellbore, $SVD_{SW}$, at the target measured depth for the subject wellbore, $TMD_{sw}$, i.e., MDL. Treat the interpretations with similar stratigraphic vertical depth of the subject wellbore, $SVD_{SW}$, as a subset. Index these subsets with different depths $SVD_{SWj}$ (MDL) by the index j=1 . . . M, where M≤N is the number of such subsets. The average $SVD_{SWj}(MDL)$ of each subset j is given by $SVD_{SWj}=Av(SVD_{SWi}(MDL)$ where the average is over the interpretations i in subset j.
- The likelihood $P(SVD_{SWj})$ of the subject wellbore being at the particular stratigraphic depth $SVD_{SWj}$ at the target measured depth, MDL, i.e., $TMD_{sw}$, can then be inferred from the cumulative misfits as $P(SVD_{SWj})=\Sigma if(Mi)$ [i within subset j]/$\Sigma if(Mi)$, where f(Mi) is a suitable function of the misfit, which increases as the misfit decreases, such as a reciprocal value. The first sum is over the interpretations i in the subset j, while the second sum is over all the interpretations i.

The probability-weighted average stratigraphic vertical depth of the subject wellbore, $SVD_{SWp}$, is then given by $SVD_{SWp}=\Sigma j(SVD_{SWj}P(SVD_{SWj}))$ Note that this depth could inadvertently fall between two valleys in the heat map curve onto a peak with maximum misfit.

The stratigraphic depth of the subject wellbore with the highest likelihood is given by $SVD_{SW}ML=(SVD_{SWj}$ where $P(SVD_{SWj})$ is largest)

Figure 16:
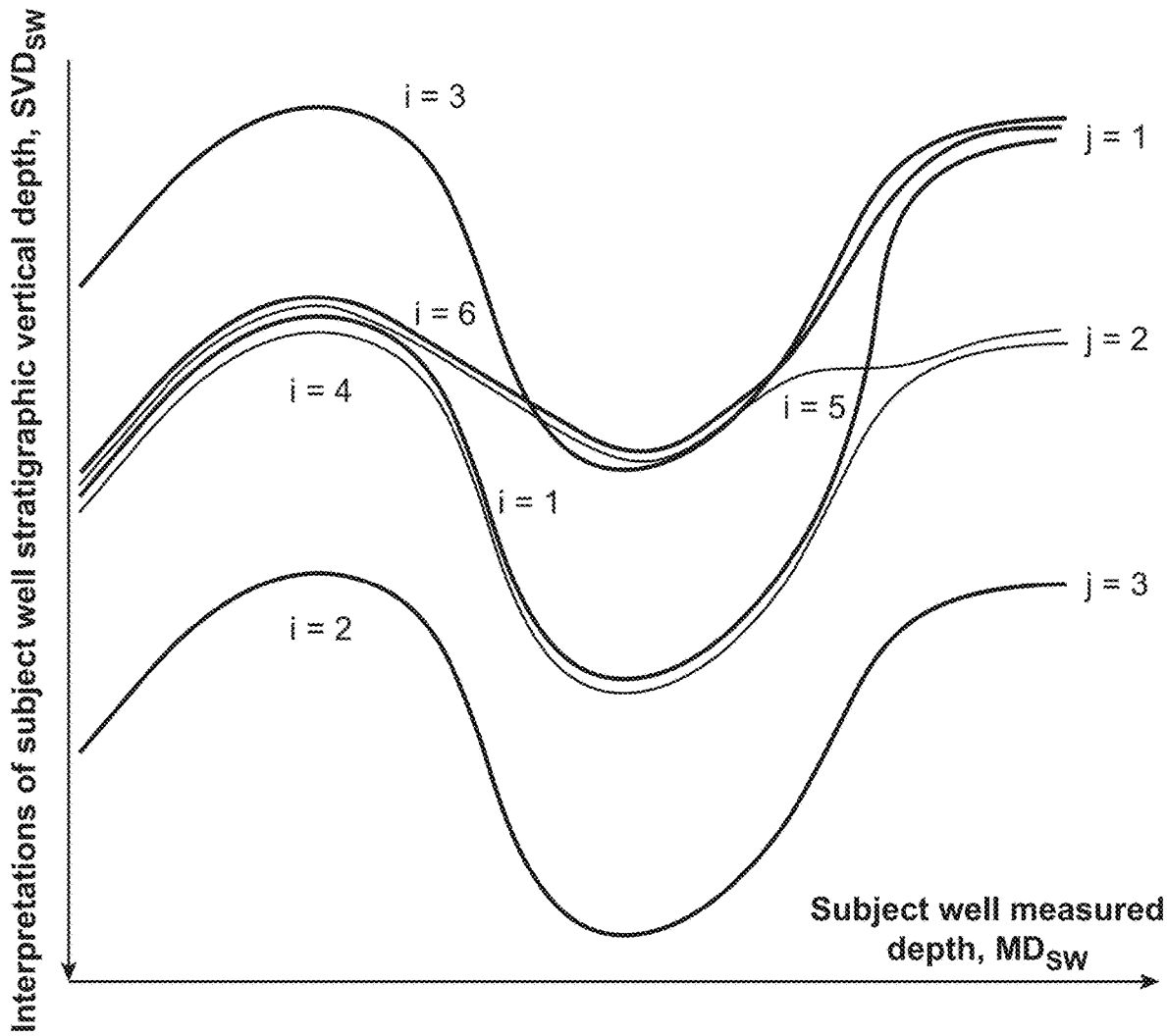
FIG. 16 depicts indexing of interpretations i versus subsets of interpretations with corresponding depth j.

Uncertainty of depth can then be computed as $sigma(SVD_{SW})=(\Sigma j(P(SVD_{SWj})(SVD_{SWj}-SVD_{SWp})^2))_{1/2}$ The indexing of interpretations i versus subsets of interpretations j is illustrated in FIG. 16, which depicts the computation of the likelihood of depth. It is noted that the likelihood of depth may be used during drilling to make drilling decisions and to evaluate a feasibility of data or information that is provided by an automated or semi-automated or manual system, such as steering control system 168. Accordingly, steering control system 168 may use the likelihood of depth, as explained above, as an indicator for display to a user, or as a secondary measure of data or information, such as measurement while drilling, MWD, data obtained during drilling. In this manner, the stratigraphic analysis and related systems and methods disclosed herein may be performed in an automated manner without user input for example, or in various degrees of semi-automated or manual execution.

It is noted that in certain instances, a range or absolute value of the likelihood may provide an indication of quality of information in a given typelog, while different typelogs may exhibit their own characteristic values or range of values for the likelihood. For example, larger observed likelihoods may be associated with high quality reference log data, while smaller observed likelihoods may be associated with poorer quality reference log data, in some implementations.

Figure 17:
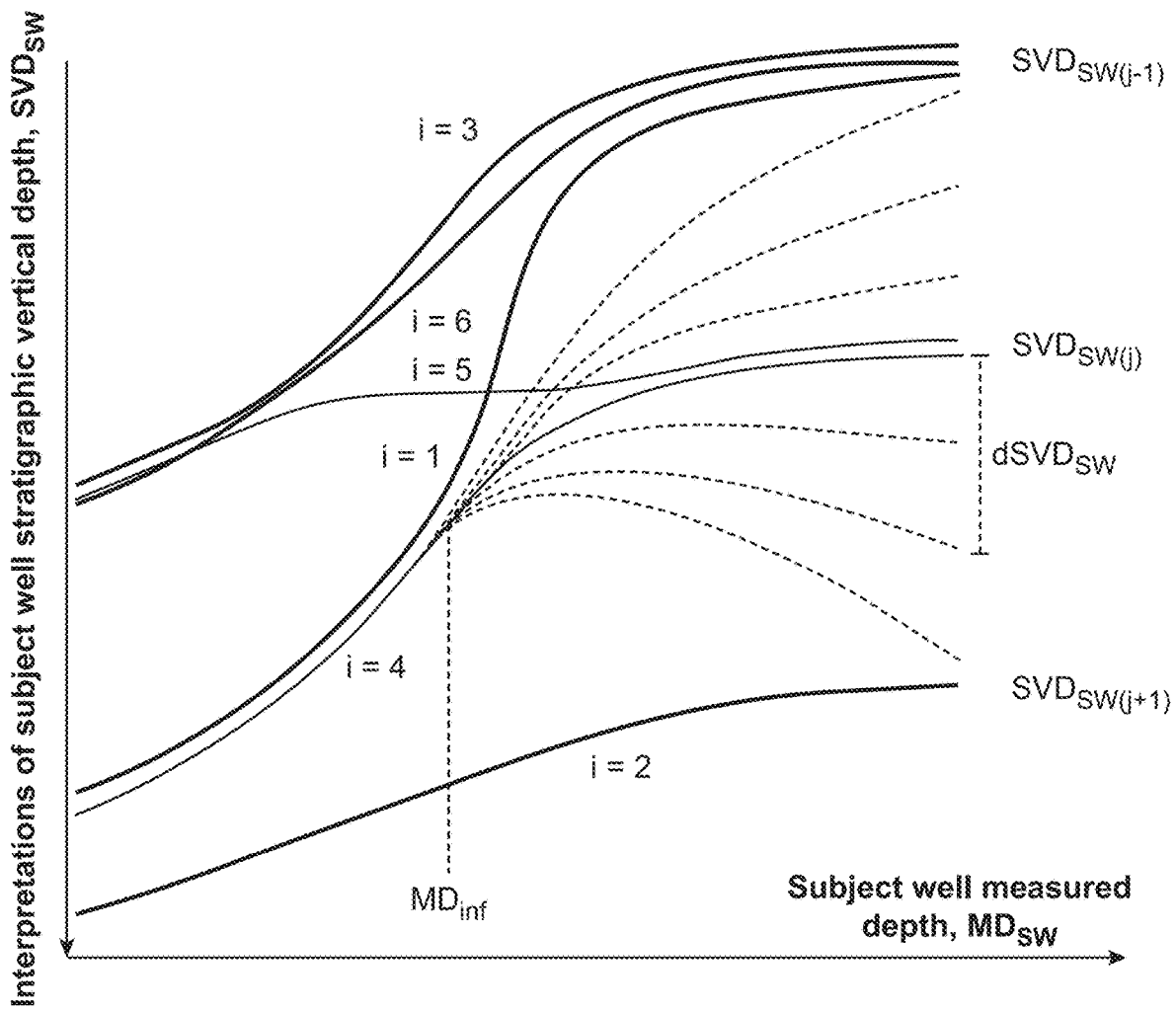
FIG. 17 depicts modification of interpretations from the last inflection point.

Extension of the Method to Continuous Probability Density of Stratigraphic Depth The discrete values at the stratigraphic depths of the subject wellbore, $SVD_{SWj}$ of the interpretation subsets j can be extrapolated into a continuous probability density p(SVDSW) by the following further steps:

- Define a modified path ($MD_{SSk}$, $SVD_{SWi}$, $dSVD_{SW}(MD_{SWk})$) for interpretation i belonging to subset j as depicted in FIG. 17, which also depicts the computation of the likelihood of depth:
  - Starting at the target measured depth of the subject wellbore, $MD_{SWL}$, decrease the index k until reaching the last inflection point $MD_{SWInf}$. The last inflection point being defined as the last point (highest k) where the second derivative $D''(k)=SVD_{SWi}(MD_{SW(k-1)})-2 \, SVD_{SWi}(MD_{SW(k)})+SVD_{SWi}(MD_{SW(k+1)})$ changes sign from D''(k-1) to D''(k), which is equivalent to the product being negative:

$D''(k-1)D''(k)<0.$

For the given modification $dSVD_{SW}$, define a modified path as:

For $MD_{SWk}<MD_{SWInf}$: $SVD_{SW(i,dSVD)}(MD_{SWk})=SVD_{SWi}(MD_{SWk})$

For $MD_{SWk}\geq MD_{sw}(I_{nf}$: $SVD_{SW(i,dSVD)}(MD_{SWk})=SVD_{SWi}(MD_{SWk})+(MD_{SWk}-MD_{SW(inf)})/(MD_{SWL}-MD_{sw(inf)})dSVD_{SW}$ Compute the misfit $M_{i,dSVD}$ of the modified path $M_{i,dSVD}=\Sigma(M(MD_{SWk},SVD_{SW(i,dSVD)}(MD_{SWk}))$ Specify the range of stratigraphic vertical depth of the subject wellbore, $SVD_{SWmin}$ to $SVD_{SWmax}$, in which the probability density $p(SVD_{SW})$ is defined:

Define $SVD_{SWmin}=SVD_{SW0}=SVD_{SW1}-SVD_{SWC}$, where $SVD_{SWC}$ is a chosen constant offset with a magnitude similar to a typical stratigraphic vertical depth of the subject wellbore, $SVD_{sw}$, offset between two adjacent subsets of interpretations.

Define $SVD_{SWmax}=SVD_{sw}(M+1)=SVD_{SWM}+SVD_{SWC}$

Select the range of modified paths for each interpretation i belonging to subset j as the stratigraphic vertical depth of the subject wellbore, $SVD_{SW}$, interval as $SVD_{SW(j-1)}$ to $SVD_{SW(j+1)}$.

Define the total value of the function f(of the misfit $M_{i,dSVD}$ as:

$$f_{total}=\Sigma i(\text{integral}(f(M_{i,dSVD})dSVD),$$

where the sum is over the interpretations i. The integral is over the interval from stratigraphic vertical depth of the subject wellbore, $SVD_{SW(j-1)}$ to $SVD_{SW(j+1)}$, where j is index of the subset that the interpretation i belongs to. This integral can be substituted by a discrete sum over small enough increments of stratigraphic vertical depth of the subject wellbore, $dSVD_{SW}$.

Define the probability density for the subject wellbore, $p(SVD_{SW})$ as:

$$p(SVD_{SW})=\Sigma i(f(M_{i,dSVD}), \text{ if } SVD_{SW(j-1)} < SVD_{SW} < SVD_{SW(j+1)})/f_{total}$$

The probability-weighted mean stratigraphic depth is then given by $$SVD_{SWp}=\text{integral}(SVD_{SW}p(SVD_{SW}))$$

Note that this depth could fall between two valleys in the heat map curve onto a peak with maximum misfit.

The stratigraphic depth with the highest likelihood is given by $$SVD_{SWML}=(SVD_{SW} \text{ where } p(SVD_{SW}) \text{ is largest})$$

The uncertainty of stratigraphic depth can then be computed as $$\text{sigma}(SVD_{SW})=(\text{integral}((SVD_{SW}-SVD_{SWp})^2 p(SVD_{SW})))^{1/2}$$

In another embodiment, a probability distribution function may be extrapolated for a single measured depth of the subject wellbore, $MD_{SW}$. At one particular measured depth of the subject wellbore, $MD_{SW}$, a probability distribution function may be a function of stratigraphic vertical depth of the subject wellbore, $SVD_{SW}$. In other words, the probability distribution function may indicate a likelihood that a point at measured depth of the subject wellbore, $MD_{SW}$, on the wellbore is at a specific stratigraphic vertical depth of the subject wellbore, $SVD_{SW}$.

In one particular example, a likelihood that a point at measured depth, $MD_{SW}=14,000'$ along the wellbore is at stratigraphic vertical depth, $SVD_{SW}=10,000'$ is different from a likelihood that a point at measured depth, $MD_{SW}=16,000'$ is at stratigraphic vertical depth, $SVD_{SW}=10,000'$. Every measured depth, $MD_{SW}$, along the wellbore has a different likelihood $PDF(SVD_{SW})$. The likelihood could be expressed as $PDF(MD_{SW}, SVD_{SW})$ or $PDF(SVD_{SW}|MD_{SW})$.

Particular Advantages

The systems, methods, and operations described herein may provide the following particular advantages and improvements:

Enable computation of the misfit between data measured on a subject wellbore with reference data. The computation of the misfit along with the methods and systems described herein may provide improved overall accuracy of measured depth for wellbores being drilled, such as compared with manual methods of stratigraphic depth correlation, or other computational methods of stratigraphic depth correlation.

Enable display of the misfit as a heat map curve with measured depth of the subject wellbore, $MD_{SW}$, on one axis and stratigraphic vertical depth of the offset wellbore, $SVD_{OW}$, in the geomodel on the other axis.

Enable an optional subtraction of the true vertical depth of the subject wellbore, $TVD_{SW}$, from the stratigraphic vertical depth of the offset wellbore, $SVD_{OW}$, to display relative stratigraphic vertical depth, RSVD, on one of the axes.

Enable an inference of the stratigraphic interpretations as lines of minimum misfit in the heat map curve.

Enable conversion of a multitude of possible interpretations of a stratigraphic heat map curve into discrete probabilities of stratigraphic vertical depth of the subject wellbore, $SVD_{SW}$, at a given measured depth on the subject well. Because the methods and systems described herein are capable of processing a large multitude of possible interpretations of stratigraphic vertical depth of the subject wellbore, $SVD_{SW}$, in a computationally tractable method that can be performed in a useful time period using a computer system, an improvement over conventional methods is expected because more possible interpretations can be evaluated, increasing the overall probability that a closest or most accurate interpretation (e.g., best match) will be found. For example, the methods and systems described herein may be capable of processing many more possible interpretations of stratigraphic vertical depth of the subject wellbore, $SVD_{SW}$, than a human or a team of humans could usefully evaluate in a relevant time period for any drilling process. Also, because the stratigraphic analysis described herein is performed using a defined algorithm, variances in results due to varying human interpretations of data, such as manual matching of log data curves, for example, may be reduced or eliminated using the methods and systems described herein.

Enable computation of the probability-weighted average vertical depth at given measured depth of the subject wellbore, $MD_{SW}$.

Enable computation of the stratigraphic vertical depth of the subject wellbore, $SVD_{SW}$, with the highest likelihood and use this information for steering decisions.

Enable computation of the stratigraphic vertical depth of the subject wellbore, $SVD_{SW}$, uncertainty at a given measured depth of the subject wellbore, $MD_{SW}$.

Enable computation of a vertical profile of continuous probability density of being at a particular stratigraphic depth at a given measured depth of the subject wellbore, $MD_{SW}$, and use the continuous probability density to evaluate steering decisions at any arbitrary measured depth of the subject wellbore, $MD_{SW}$.

Enable selection of a stratigraphic interpretation with the highest likelihood to identify the trajectory of the wellbore through the reference geomodel.

If the stratigraphic vertical depth of the subject wellbore, $SVD_{SW}$, is deeper than the desired depth in the stratigraphic column, enable steering of the wellbore toward shallower depth.

Conversely, if the stratigraphic vertical depth of the subject wellbore, $SVD_{SW}$, is shallower than the desired depth in the stratigraphic column, enable steering of the wellbore toward greater depth.

Enable weighting of the possible stratigraphic interpretations by their likelihood to compute the expected wellbore length in zone, the expected production, expected wellbore value and other economic or production metrics.

Enable using the possible stratigraphic interpretations and their associated likelihood to plan frac stages of the well. For example, frac stages may be performed at a given stratigraphic location with greater accuracy or precision using the stratigraphic interpretations and methods described herein.

Enable using the uncertainty in stratigraphic vertical depth to assess risks, such as reduced production, collision with wellbores above or below, penetration of horizons for which the operator does not have the mineral rights. For example, when an uncertainty in stratigraphic vertical depth of the subject wellbore, $SVD_{SW}$, is larger than a given threshold, or in a certain range of values, a higher risk of spatial inaccuracy of the location of the subject wellbore may be assumed. Such higher risks may guide certain drilling or steering decisions for the subject wellbore during drilling.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer system, comprising:
    a processor enabled to access memory media storing instructions executable by the processor for:
        for a subject wellbore, generating a misfit curve between stratigraphic vertical depth of an offset wellbore, $SVD_{ow}$ and a measured depth of the subject wellbore, $MD_{sw}$;
        based on the misfit curve, calculating a plurality of likelihoods that respective target measured depths for the subject wellbore, $TMD_{sw}$, are equal to or within a tolerance of respective stratigraphic vertical depths of the subject wellbore, $SVD_{sw}$, respectively corresponding to a plurality of interpretations of stratigraphic vertical depth of the subject wellbore, $SVD_{sw}$ based on a subject well log for the subject wellbore and an offset well log respectively for at least one offset wellbore, wherein the interpretations are paths through the misfit curve;
        assigning, to the subject wellbore, a likelihood calculated using a starting measured depth of the subject wellbore, $MD_{sw1}$, and the target measured depth for the subject wellbore, $TMD_{sw}$, from the plurality of likelihoods that a target measured depth for the subject wellbore, $TMD_{sw}$, is equal to or within a tolerance of a stratigraphic vertical depth of the subject wellbore, $SVD_{sw}$, associated with the target measured depth for the subject wellbore, $TMD_{sw}$; and
        based on the misfit curve and the assigned likelihood, adjusting at least one drilling parameter during drilling of the subject wellbore.

2. The computer system of claim 1, further comprising instructions for:
    selecting the starting measured depth of the subject wellbore, $MD_{sw1}$, to begin the misfit curve, wherein the target measured depth for the subject wellbore, $TMD_{sw}$ is greater than the starting measured depth of the subject wellbore, $MD_{sw1}$, wherein the instructions for generating the misfit curve further comprise instructions for:
        beginning with the starting measured depth of the subject wellbore, $MD_{sw1}$, identifying the plurality of interpretations of stratigraphic vertical depth of the subject wellbore, $SVD_{sw}$, along the subject wellbore.

3. The computer system of claim 2, wherein the likelihood calculated is based on a sum of an inverse function of an equation describing the misfit curve between the starting measured depth of the subject wellbore, $MD_{sw1}$, and the target measured depth for the subject wellbore, $TMD_{sw}$.

4. The computer system of claim 1, wherein the instructions for adjusting the at least one drilling parameter for drilling of the subject wellbore further comprise instructions for:
    adjusting a steering direction of the subject wellbore during drilling of the subject wellbore.

5. The computer system of claim 1, wherein the memory media further comprise instructions for:
    ordering the plurality of interpretations according to a stratigraphic vertical depth of the subject wellbore, $SVD_{sw}$, wherein the stratigraphic vertical depth of the subject wellbore, $SVD_{sw}$, is determined at the target measured depth for the subject wellbore, $TMD_{sw}$; and
    grouping the plurality of interpretations into sets of interpretations, each set of interpretations respectively having a similar value for the stratigraphic vertical depth of the subject wellbore, $SVD_{sw}$.

6. The computer system of claim 5, wherein the instructions for calculating the plurality of likelihoods that respective target measured depths for the subject wellbore, $TMD_{sw}$, are equal to or within a tolerance of respective stratigraphic vertical depths of the subject wellbore, $SVD_{sw}$, respectively corresponding to the plurality of interpretations of stratigraphic vertical depth of the subject wellbore, $SVD_{sw}$, further comprise instructions for:
    calculating the plurality of likelihoods that respective target measured depths for the subject wellbore, $TMD_{sw}$, are equal to or within a tolerance of respective stratigraphic vertical depths of the subject wellbore, $SVD_{sw}$, respectively for each of the sets of interpretations.

7. The computer system of claim 5, wherein the memory media further comprise instructions for:
    based on the sets of interpretations, extrapolating a continuous probability density function describing the plurality of likelihoods that the stratigraphic vertical depth of the subject wellbore, $SVD_{sw}$, is equal to or within a tolerance of measured depth for depths between the starting measured depth of the subject wellbore, $MD_{SW1}$, and the target measured depth for the subject wellbore, $TMD_{sw}$.

8. The computer system of claim 1, wherein the memory media further comprise instructions for:
    based on the plurality of likelihoods calculated, calculating a probability weighted average of the stratigraphic vertical depth of the subject wellbore, $SVD_{sw}$.

9. The computer system of claim 1, wherein the memory media further comprise instructions for:
    based on the plurality of likelihoods calculated, calculating the stratigraphic vertical depth of the subject wellbore, $SVD_{sw}$, respectively corresponding to a maximum of the plurality of likelihoods being equal to or within a tolerance of the target measured depth for the subject wellbore, $TMD_{sw}$.

10. The computer system of claim 1, wherein the memory media further comprise instructions for:
based on the plurality of likelihoods calculated, calculating an uncertainty of the stratigraphic vertical depth of the subject wellbore, $SVD_{sw}$, respectively being equal to or within a tolerance of the target measured depth for the subject wellbore, $TMD_{sw}$.

11. The computer system of claim 1, wherein the memory media further comprise instructions for:
calculating a path of the subject wellbore based on a likelihood calculated using minima of misfit values.

12. The computer system of claim 1, wherein the memory media further comprise instructions for:
generating a user interface to graphically display the misfit curve.

13. A method, comprising:
(a) for a subject wellbore, generating, by a computer system, a misfit curve between stratigraphic vertical depth of at least one offset wellbore, $SVD_{ow}$, a measured depth of the subject wellbore, $MD_{SW}$;
(b) based on the misfit curve, calculating, by the computer system, a plurality of likelihoods that respective target measured depths for the subject wellbore, $TMD_{sw}$, are equal to or within a tolerance of respective stratigraphic vertical depths of the subject wellbore, $SVD_{sw}$, respectively corresponding to a plurality of interpretations of the stratigraphic vertical depth of the subject wellbore, $SVD_{sw}$, based on a subject well log for the subject wellbore and an offset well log respectively for the at least one offset wellbore, wherein the interpretations are paths through the misfit curve;
(c) assigning, to the subject wellbore by the computer system, a likelihood calculated using a starting measured depth of the subject wellbore, $MD_{SW1}$, and the target measured depth for the subject wellbore, $TMD_{sw}$, from the plurality of likelihoods that a target measured depth for the subject wellbore, $TMD_{sw}$, is equal to or within a tolerance of a stratigraphic vertical depth of the subject wellbore, $SVD_{sw}$, associated with the target measured depth for the subject wellbore, $TMD_{sw}$; and
(d) based on the misfit curve and the assigned likelihood, adjusting, by the computer system, at least one drilling parameter during drilling of the subject wellbore.

14. The method of claim 13, further comprising:
selecting, by the computer system, the starting measured depth of the subject wellbore, $MD_{SW1}$, to begin the misfit curve, wherein the target measured depth for the subject wellbore, $TMD_{sw}$, is greater than the starting measured depth of the subject wellbore, $MD_{SW1}$, wherein generating the misfit curve further comprises:
beginning with the starting measured depth of the subject wellbore, $MD_{SW1}$, identifying the plurality of interpretations of the stratigraphic vertical depth of the subject wellbore, $SVD_{sw}$, along the subject wellbore.

15. The method of claim 14, wherein the likelihood calculated is based on a sum of an inverse function of an equation describing the misfit curve between the starting measured depth of the subject wellbore, $MD_{SW1}$, and the target measured depth for the subject wellbore, $TMD_{sw}$.

16. The method of claim 13, wherein adjusting the at least one drilling parameter for drilling of the subject wellbore further comprises:

adjusting, by the computer system, a steering direction of the subject wellbore during drilling of the subject wellbore.

17. The method of claim 13, further comprising:
ordering, by the computer system, the plurality of interpretations according to a stratigraphic vertical depth of the subject wellbore, $SVD_{sw}$, wherein the stratigraphic vertical depth of the subject wellbore, $SVD_{sw}$, is determined at the target measured depth for the subject wellbore, $TMD_{sw}$; and
grouping, by the computer system, the plurality of interpretations into sets of interpretations, each set of interpretations respectively having a similar value for the stratigraphic vertical depth of the subject wellbore, $SVD_{sw}$.

18. The method of claim 17, wherein calculating the plurality of likelihoods that respective target measured depths for the subject wellbore, $TMD_{sw}$, are equal to or within a tolerance of respective stratigraphic vertical depths of the subject wellbore, $SVD_{sw}$, respectively corresponding to the plurality of interpretations of stratigraphic vertical depth of the subject wellbore, $SVD_{sw}$, further comprises:
calculating, by the computer system, the plurality of likelihoods that respective target measured depths for the subject wellbore, $TMD_{sw}$, are equal to or within a tolerance of respective stratigraphic vertical depths of the subject wellbore, $SVD_{sw}$, respectively for each of the sets of interpretations.

19. The method of claim 17, further comprising:
based on the sets of interpretations, extrapolating, by the computer system, a continuous probability density function describing the plurality of likelihoods calculated, that the stratigraphic vertical depth of the subject wellbore, $SVD_{sw}$, is equal to or within a tolerance of measured depth for depths between the starting measured depth of the subject wellbore, $MD_{sw1}$, and the target measured depth for the subject wellbore, $TMD_{sw}$.

20. The method of claim 13, further comprising:
based on the plurality of likelihoods calculated, calculating, by the computer system, a probability weighted average of the stratigraphic vertical depth of the subject wellbore, $SVD_{sw}$.

21. The method of claim 13, further comprising:
based on the plurality of likelihoods calculated, calculating, by the computer system, the stratigraphic vertical depth of the subject wellbore, $SVD_{sw}$, respectively corresponding to a maximum of the plurality of likelihoods calculated being equal to or within a tolerance of the target measured depth for the subject wellbore, $TMD_{sw}$.

22. The method of claim 13, further comprising:
based on the plurality of likelihoods calculated, calculating, by the computer system, an uncertainty of the stratigraphic vertical depth for the subject wellbore, $SVD_{sw}$, respectively being equal to or within a tolerance of the target measured depth for the subject wellbore, $TMD_{sw}$.

23. The method of claim 13, further comprising:
calculating, by the computer system, a path of the subject wellbore based on a second likelihood calculated using minima misfit values.

24. The method of claim 13, further comprising:
generating, by the computer system, a user interface to graphically display the misfit curve.

25. The method of claim 13, wherein steps (a) through (d) are (i) performed automatically by the computer system, (ii)

repeated a plurality of times during drilling of the subject wellbore, or (iii) both (i) and (ii).

26. A computer system, comprising:
a processor enabled to access memory media storing instructions executable by the processor for:
for a subject wellbore, selecting a starting measured depth of the subject wellbore, $MD_{SW1}$, to begin a stratigraphic depth analysis, wherein the stratigraphic depth analysis is associated with a target measured depth for the subject wellbore, $TMD_{sw}$, that is greater than the starting measured depth of the subject wellbore, $MD_{SW1}$;
beginning with the starting measured depth of the subject wellbore, $MD_{SW1}$, performing the stratigraphic depth analysis by identifying a plurality of sequences of stratigraphic vertical depths of the subject wellbore, $SVD_{sw}$, along the subject wellbore and generating a heat map curve for the subject wellbore, the heat map curve indicative of a misfit between well log data of the subject wellbore and offset well log data indicative of stratigraphic vertical depth of at least one offset wellbore, $SVD_{ow}$, respectively, wherein the sequences are paths through the heat map curve;
ordering the plurality of sequences according to a stratigraphic vertical depth of the subject wellbore, $SVD_{sw}$, for each sequence in the plurality of sequences, wherein the stratigraphic vertical depth of the subject wellbore, $SVD_{sw}$, is determined with respect to the target measured depth for the subject wellbore, $TMD_{sw}$;
grouping the plurality of sequences into sets of sequences, each set of sequences respectively having a similar value for the stratigraphic vertical depth of the subject wellbore, $SVD_{sw}$;
calculating a likelihood using the starting measured depth of the subject wellbore, $MD_{SW1}$, and the target measured depth for the subject wellbore, $TMD_{sw}$, that the target measured depth for the subject wellbore, $TMD_{sw}$, is equal to or within a tolerance of the stratigraphic vertical depth of the subject wellbore, $SVD_{sw}$, respectively for each of the sets of sequences, wherein the likelihood is based on a sum of an inverse function of an equation describing the misfit between the starting measured depth of the subject wellbore, $MD_{SW1}$, and the target measured depth for the subject wellbore, $TMD_{sw}$; and
based on the likelihood calculated, adjusting a steering direction of the subject wellbore during drilling of the subject wellbore.

27. The computer system of claim 26, wherein the memory media further comprise instructions for:
based on the likelihood calculated, calculating an uncertainty of the stratigraphic vertical depth of the subject wellbore, $SVD_{sw}$, respectively being equal to or within a tolerance of the target measured depth for the subject wellbore, $TMD_{sw}$.

28. The computer system of claim 26, wherein the memory media further comprise instructions for:
generating a user interface to graphically display a heat map curve indicative of the misfit between the starting measured depth of the subject wellbore, $MD_{SW1}$, and the target measured depth for the subject wellbore, $TMD_{sw}$.

29. The computer system of claim 26, wherein the instructions for adjusting a steering direction of the subject wellbore further comprise instructions for:
adjusting a drilling parameter during drilling of the subject wellbore.

30. The computer system of claim 26, wherein the memory media further comprise instructions for:
grouping the plurality of sequences into sets of sequences, each set of sequences respectively having a similar value for the stratigraphic vertical depth of the subject wellbore, $SVD_{sw}$; and
based on the sets of sequences, extrapolating a continuous probability density function describing the likelihood calculated, that the stratigraphic vertical depth of the subject wellbore, $SVD_{sw}$, is equal to or within a tolerance of a target stratigraphic vertical depth of the subject wellbore, $SVD_{sw}$, for measured depths between the starting measured depth of the subject wellbore, $MD_{SW1}$, and the target measured depth for the subject wellbore, $TMD_{sw}$.

31. The computer system of claim 26, wherein the memory media further comprise instructions for:
based on the sets of sequences, extrapolating a continuous probability density function of stratigraphic vertical depth of the subject wellbore, $SVD_{sw}$, for a given measured depth along the subject wellbore, the continuous probability density function describing the likelihood calculated, at the given measured depth.

* * * * *